United States Patent
Park et al.

(10) Patent No.: US 10,841,911 B2
(45) Date of Patent: Nov. 17, 2020

(54) METHOD FOR TRANSMITTING DOWNLINK CONTROL INFORMATION IN WIRELESS COMMUNICATION SYSTEM

(71) Applicant: LG ELECTRONICS INC., Seoul (KR)

(72) Inventors: Jonghyun Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 15/765,356

(22) PCT Filed: Oct. 4, 2016

(86) PCT No.: PCT/KR2016/011055
§ 371 (c)(1),
(2) Date: Nov. 30, 2018

(87) PCT Pub. No.: WO2017/057989
PCT Pub. Date: Apr. 6, 2017

(65) Prior Publication Data
US 2019/0387501 A1  Dec. 19, 2019

Related U.S. Application Data

(60) Provisional application No. 62/236,848, filed on Oct. 2, 2015, provisional application No. 62/335,643, filed on May 12, 2016.

(51) Int. Cl.
*H04W 72/04* (2009.01)
*H04W 72/12* (2009.01)
*H04L 5/00* (2006.01)

(52) U.S. Cl.
CPC ........... *H04W 72/042* (2013.01); *H04L 5/005* (2013.01); *H04L 5/0044* (2013.01);
(Continued)

(58) Field of Classification Search
None
See application file for complete search history.

(56) References Cited

U.S. PATENT DOCUMENTS

2011/0255485 A1* 10/2011 Chen ................. H04W 72/0453
370/329
2013/0016655 A1  1/2013 Heo et al.
(Continued)

FOREIGN PATENT DOCUMENTS

WO  2014-0176204 A1  10/2014

OTHER PUBLICATIONS

Huawei, et al.; "DCI Content/format for MTC Transmission"; R1-155110, 3GPP TSG RAN WGI Meeting #82bis, Malmo, Sweden, Sep. 25, 2015.
(Continued)

*Primary Examiner* — Scott M Sciacca
(74) *Attorney, Agent, or Firm* — Dentons US LLP

(57) ABSTRACT

A method for transmitting DCI by a base station in a wireless communication system according to an embodiment of the present invention may comprise the steps of: allocating a resource for data transmission; transmitting, in a first DCI format, DCI including scheduling information associated with the allocated resource; and transmitting data according to the scheduling information, wherein a payload size of the first DCI format may be adjusted to be the same as that of a pre-configured second DCI format and transmitted through a CSS when the DCI includes scheduling information relating to multicast/broadcast data, and the payload size of the first DCI format may be transmitted, without being adjusted, through a USS when the DCI includes scheduling information relating to unicast data.

16 Claims, 15 Drawing Sheets

(52) U.S. Cl.
CPC ....... *H04L 5/0053* (2013.01); *H04W 72/1273* (2013.01); *H04W 72/1278* (2013.01)

(56) References Cited

U.S. PATENT DOCUMENTS

| | | | |
|---|---|---|---|
| 2014/0044056 A1* | 2/2014 | Chen | H04L 5/0053 370/329 |
| 2014/0105154 A1 | 4/2014 | Yang et al. | |
| 2014/0161014 A1 | 6/2014 | Sasaki | |

OTHER PUBLICATIONS

International Search Report from PCT/KR2016/011055, dated Jan. 25, 2017.
Written Opinion of the ISA from PCT/KR2016/011055, dated Jan. 25, 2017.

\* cited by examiner

[Fig. 1]
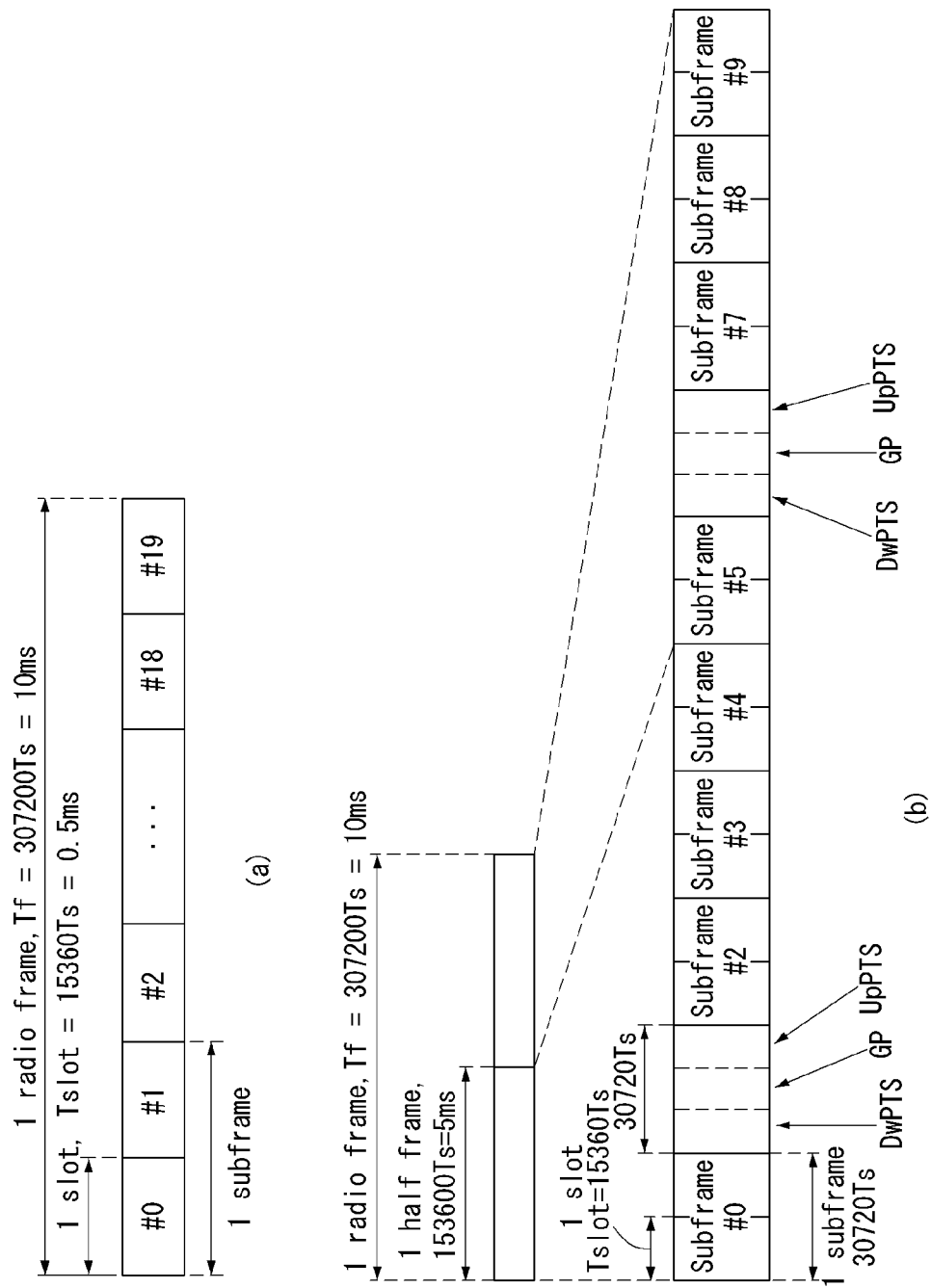

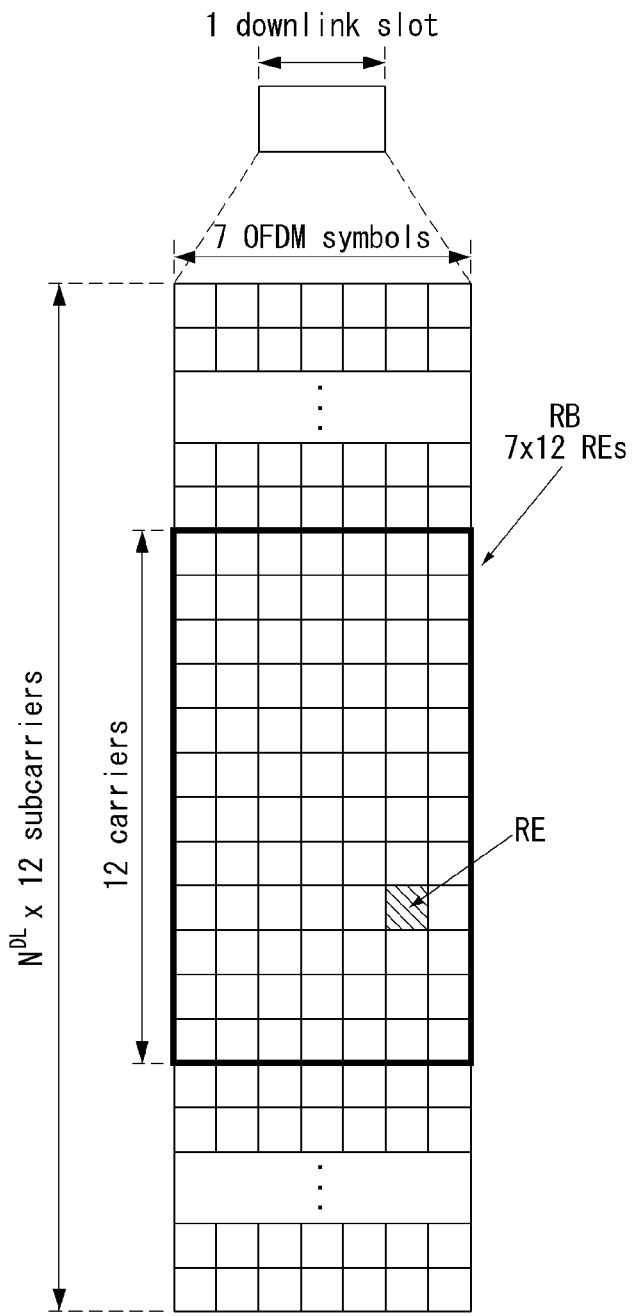

[Fig. 3]
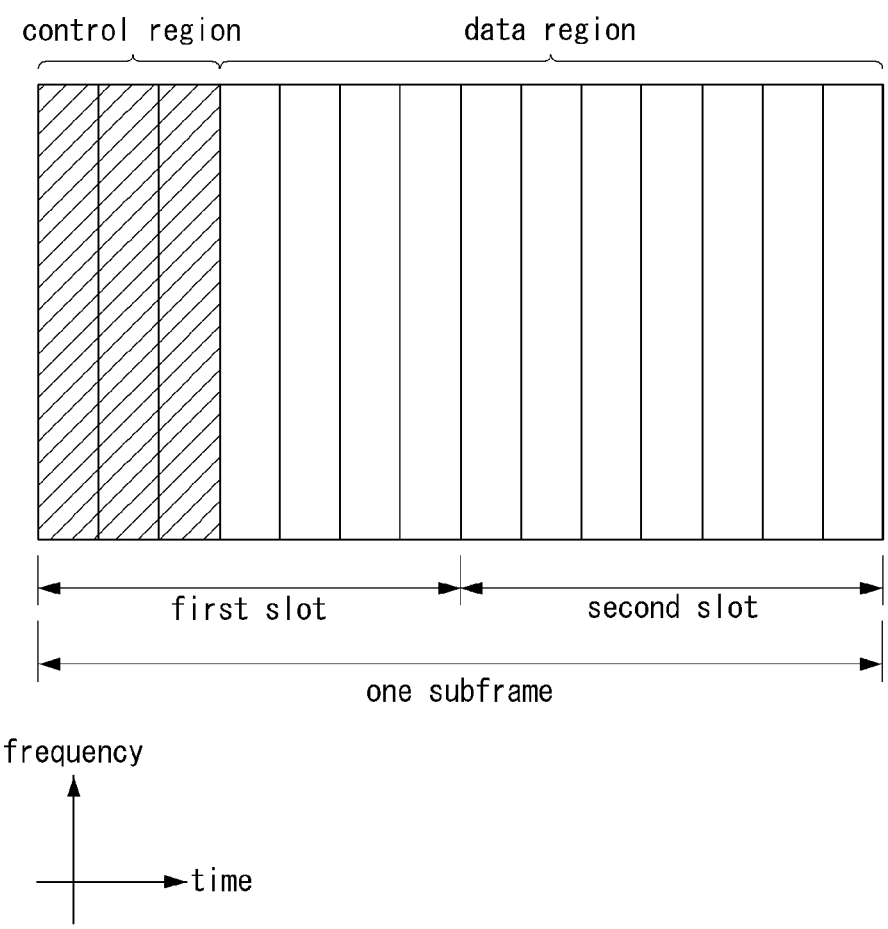

[Fig. 4]
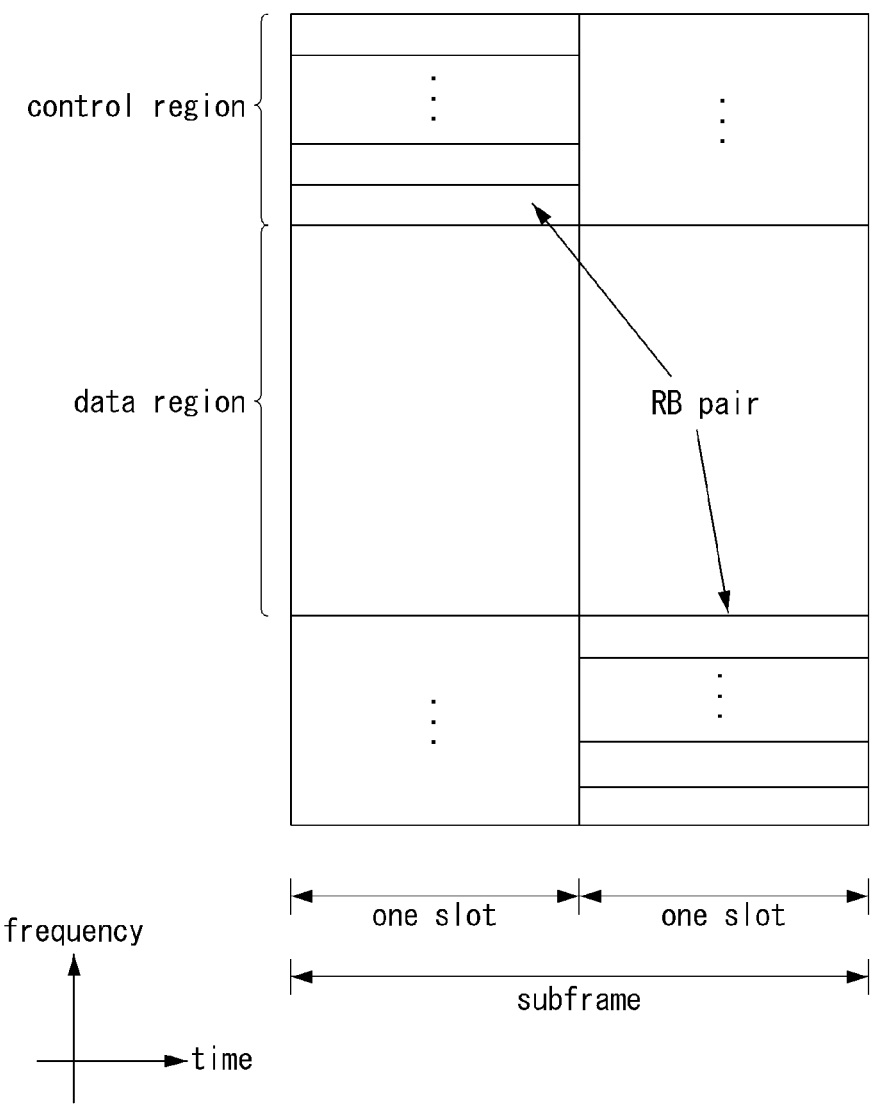

[Fig. 5]
(a) 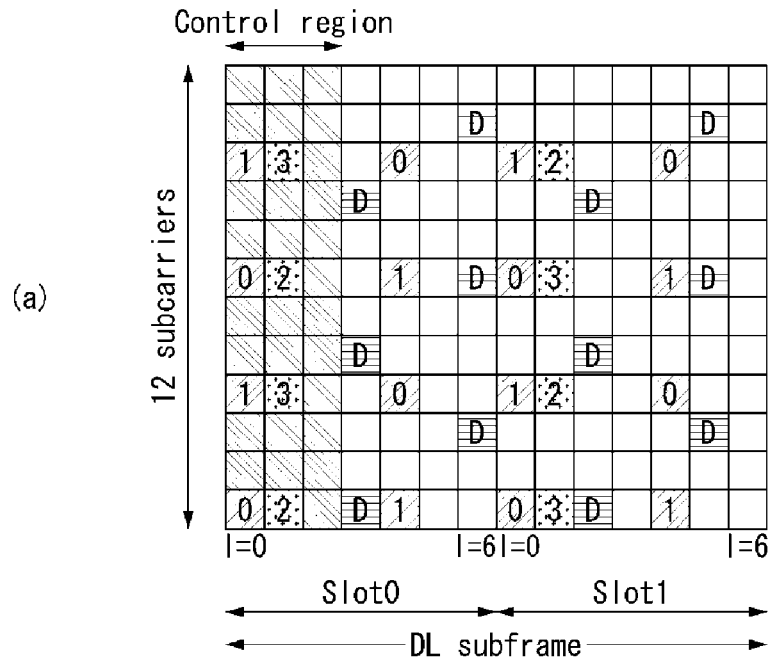
(b) 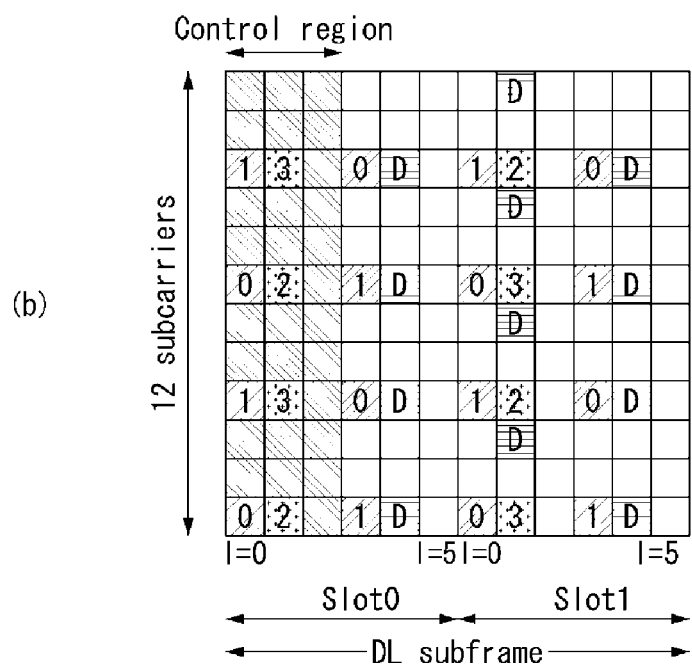

[Fig. 6]
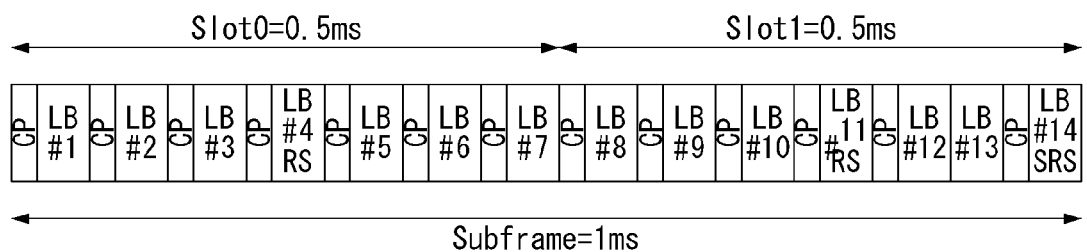

【Fig. 7】
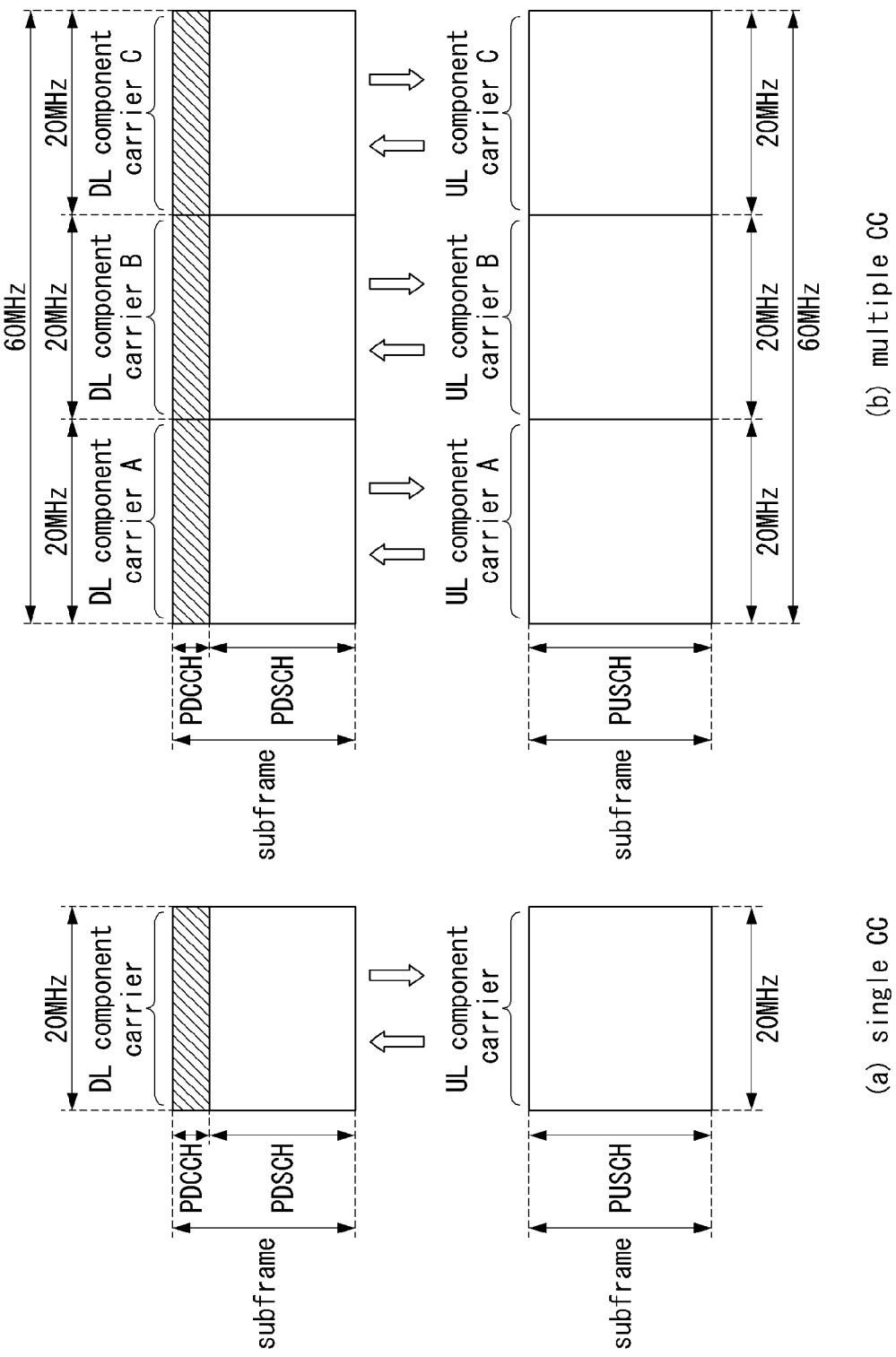

[Fig. 8]
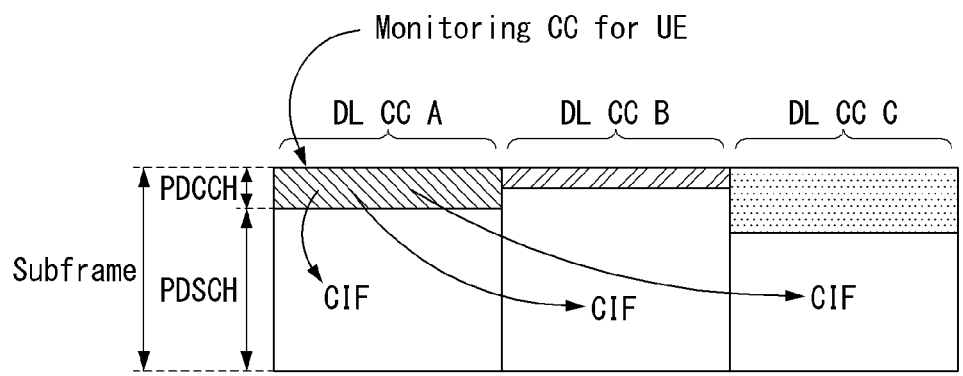
[Fig. 9]
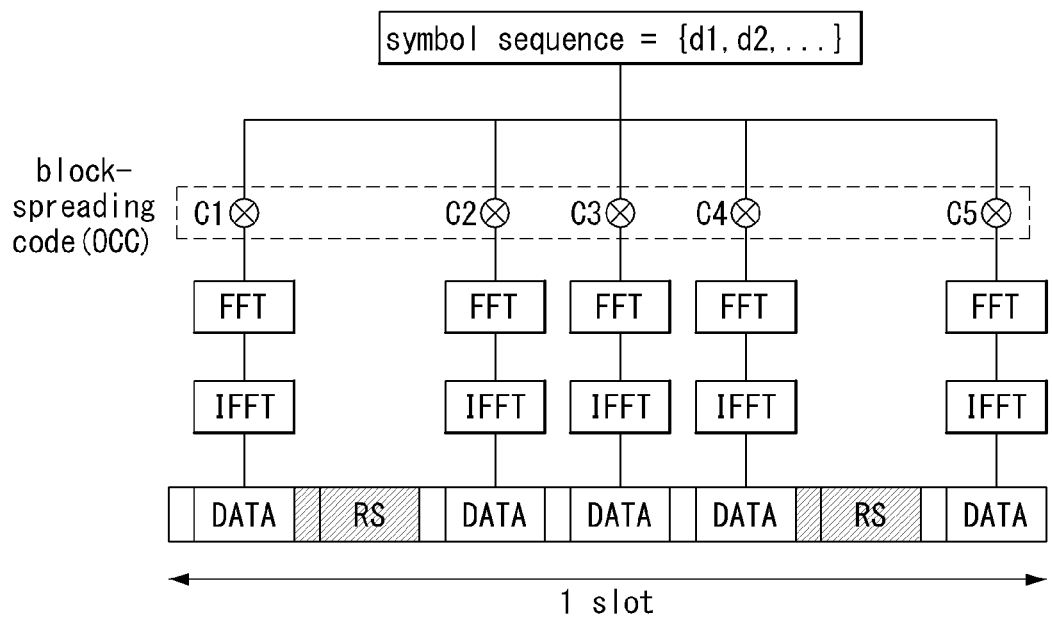

[Fig. 10]
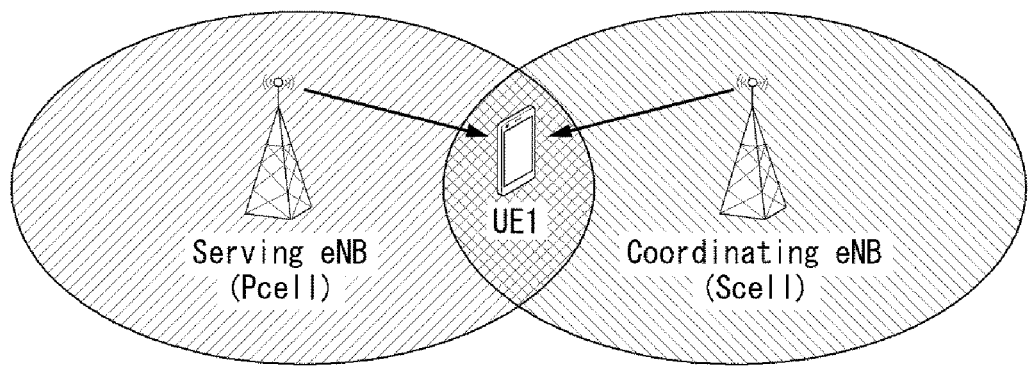
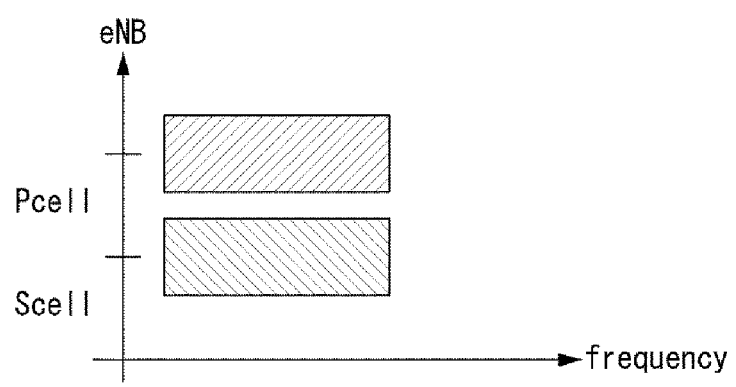
[Fig. 11]
eNB
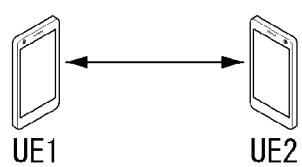
UE1   UE2

[Fig. 12]
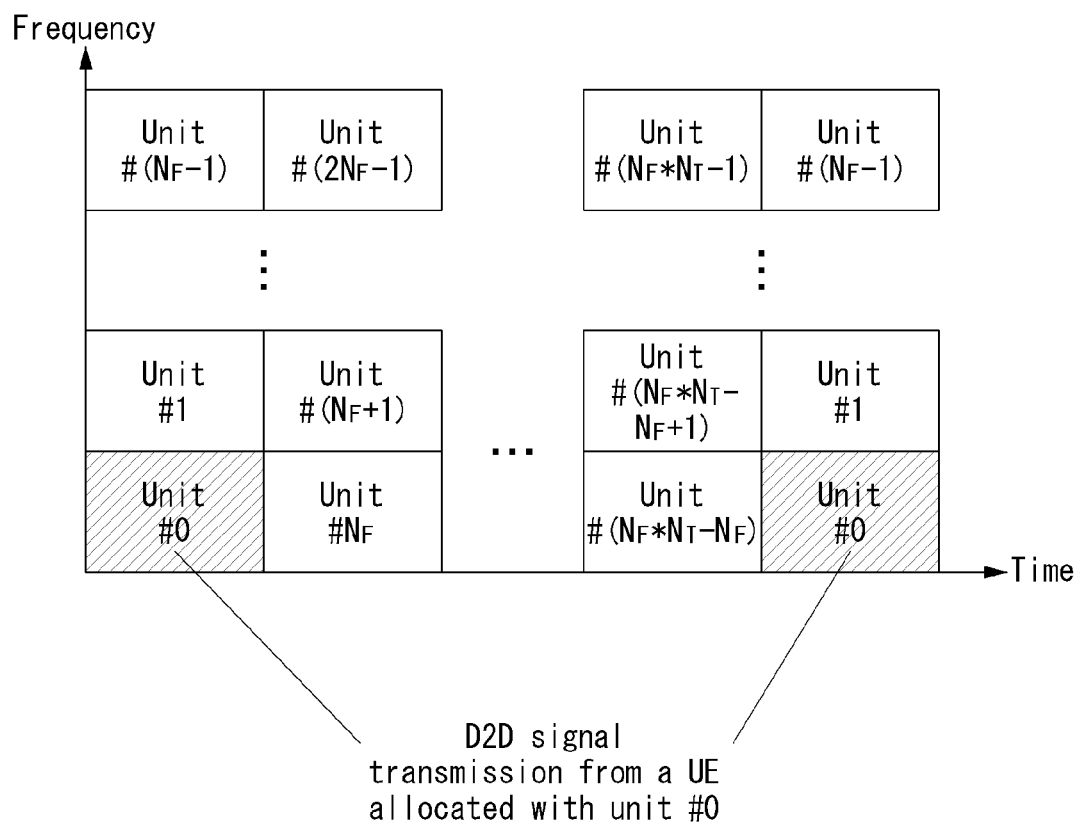

[Fig. 13]
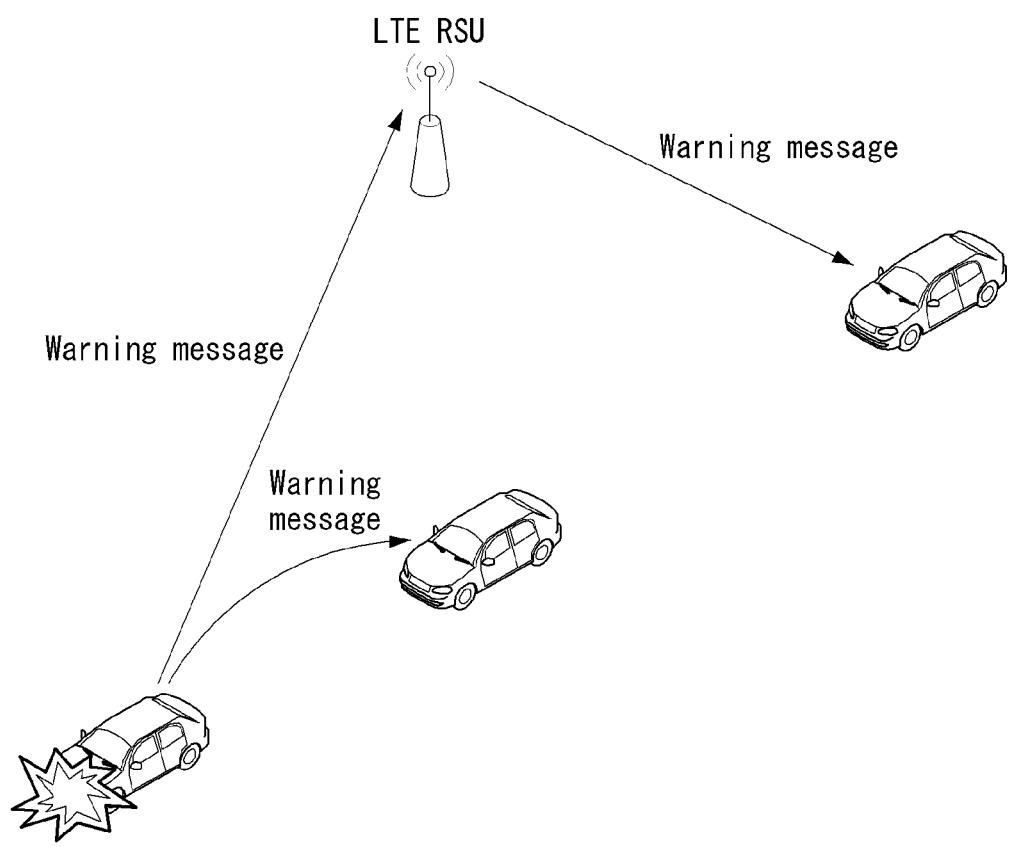

(a) 2A LD CDD: CIF (3bit) | RA Hdr. | TB swap | MCS1 (5bit) | $\lceil N_{RB}^{DL}/P \rceil$ | NDI1 | RV1 (2bit) | TPC (2bit) | DAI (2bit) | HARQ (4bit) | MCS2 (5bit) | NDI2 | RV2 (2bit) | Rank (0or2bit)

(b) 2C 8L BF: CIF (3bit) | RA Hdr. | 3bit Ant port, Scrbl ID, # of layer | MCS1 (5bit) | $\lceil N_{RB}^{DL}/P \rceil$ | NDI1 Ant P | RV1 (2bit) | TPC (2bit) | DAI (2bit) | HARQ (4bit) | MCS2 (5bit) | NDI2 Ant P | RV2 (2bit) | SRS (0or1)

(c) 2D CoMP: CIF (3bit) | RA Hdr. | 3bit Ant port, Scrbl ID, # of layer | MCS1 (5bit) | $\lceil N_{RB}^{DL}/P \rceil$ | NDI1 Ant P | RV1 (2bit) | TPC (2bit) | DAI (2bit) | HARQ (4bit) | MCS2 (5bit) | NDI2 Ant P | RV2 (2bit) | SRS (0or1) | PQI (2bit)

[Fig. 16]
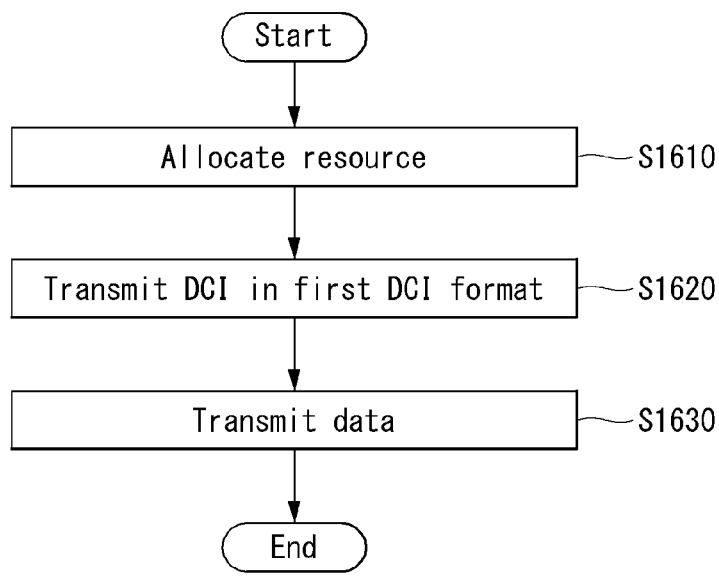
[Fig. 17]
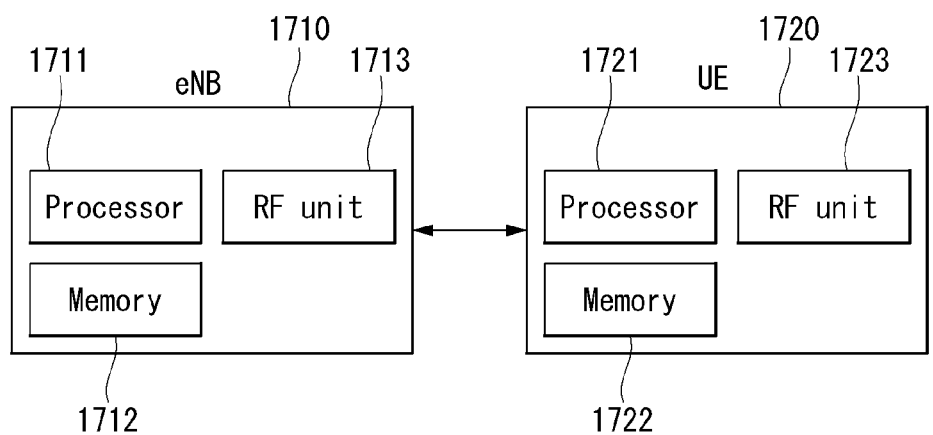

【Fig. 18】
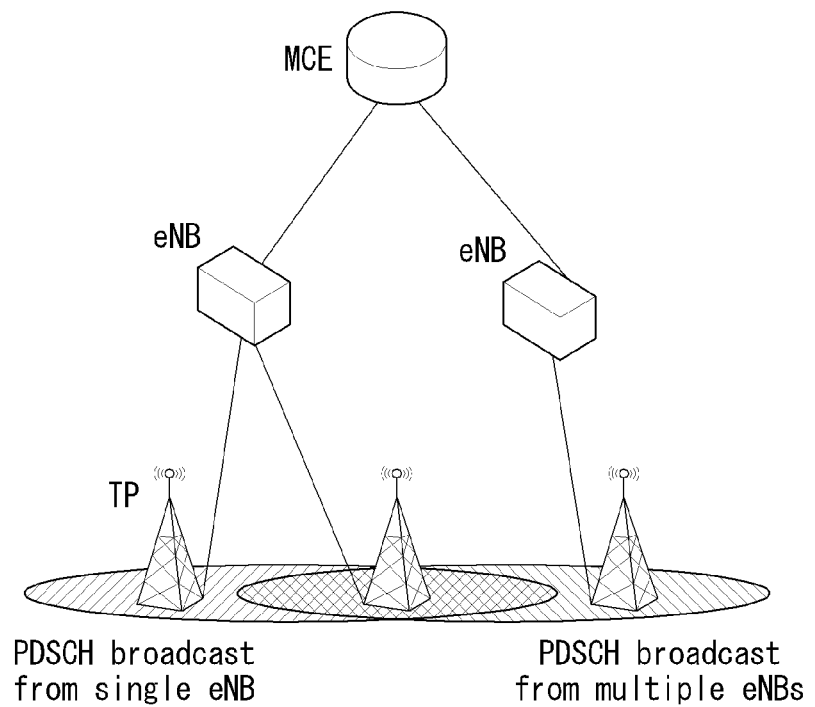

METHOD FOR TRANSMITTING DOWNLINK CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2016/011055, filed on Oct. 4, 2016, which claims the benefit of U.S. Provisional Applications No. 62/236,848, filed on Oct. 2, 2015, No. 62/335,643, filed on May 12, 2016, the contents of which are all hereby incorporated by reference herein in their entirety.

TECHNICAL FIELD

The present invention relates to a wireless communication system and, more particularly, to a method for transmitting and receiving Downlink control Information (DCI) in a wireless communication system and an apparatus for implementing the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The object of the present invention is to enable a base station to adjust payload sizes to be identical when transmitting different DCI formats, thereby minimizing the number of times for a user equipment (UE) to perform blind detection.

Such an efficient method is also applicable to a wireless communication system supporting a V2X (Vehicle to everything) service.

The technical problems solved by the present invention are not limited to the above technical problems and those skilled in the art may understand other technical problems from the following description.

Technical Solution

In one general aspect of the present invention, there is provided a method for transmitting Downlink Control Information (DCI) by a base station in a wireless communication system, the method including: allocating a resource for data transmission; transmitting, in a first DCI format, DCI including scheduling information about the allocated resource; and transmitting data according to the scheduling information, wherein the first DCI format is transmitted in a payload size, which is adjusted to be identical to a payload size of a pre-configured second DCI format, through a Common Search Space (CSS) when the DCI includes scheduling information about multicast/broadcast data, and wherein the first DCI format is transmitted in a payload size, which is not adjusted, through a UE-specific Search Space (USS) when the DCI includes scheduling information about unicast data.

The payload size of the first DCI format may be adjusted to be identical to the payload size of the second DCI format by deleting at least one field of fields included in the payload of the first DCI format or by reducing a bit size of the at least one field.

The second DCI format may be DCI format 2A and the first DCI format may be DCI format 2C.

The first DCI format may be scrambled by a Point to Multipoint-Radio Network Temporary Identifier (PTM-RNTI), which is newly defined for multicast/broadcast transmission, and the scrambled first DCI format is transmitted.

When the first and second DCI formats are transmitted in a Frequency Division Duplex (FDD) scheme and a bit size of a Rank field included in a payload of the second DCI format is set to 0 bit, at least one field of a New Data Indicator (NDI) field, a Modulation and Coding Scheme (MCS) 2 field, a Redundancy Version (RV) 2 field, a Hybrid Automatic Repeat Request (HARQ) field, a Transmit Power Control (TPC) field, and a Carrier Indicator Field (CIF) included in the payload of the first DCI format may be deleted or a bit size of the at least one field may be reduced.

When the first and second DCI formats are transmitted in a Time Division Duplex (TDD) scheme and a bit size of a rank field included in the second DCI format is set to 2 bits, a Sound Reference Signal (SRS) field is deleted from the payload of the first DCI format and the payload of the first DCI format is transmitted.

When the first and second DCI formats are transmitted in a TDD method and a bit size of a Rank field included in the payload of the second DCI format is set to 0 bit, an SRS field is deleted from the payload of the first DCI format, the payload of the first DCI format is transmitted and, additionally, at least one field of an NDI field, an MCS 2 field, a RV 2 field, an HARQ field, a TPC field, a Downlink Assignment Index (DAI) field, and a CIF may be deleted or a bit size of the at least one field may be reduced.

The second DCI format may be DCI format 2A and the first DCI format may be DCI format 2D.

When the first and second DCI formats are transmitted in an FDD scheme and a bit size of a Rank field included in the payload of the second DCI format is set to 0 bits a PDSCH RE Mapping and Quasi-co-location Indicator (PQI) field may be deleted from the payload of the first DCI format and the payload of the first DCI format is transmitted.

When a PTM-RNTI for indicating PQI information included in the deleted PQI field is separately defined, the first DCI format may be scrambled by the PTM-RNTI and transmitted.

Information about a PTM-RNTI corresponding to the PQI information may be transmitted via higher layer signaling.

When the first and second DCI formats are transmitted in a TDD scheme and a bit size of a Rank field included in the payload of the second DCI format is set to 2 bits, a PQI field and a SRS field may be deleted from the payload of the first DCI format and the payload of the first DCI format is transmitted.

When the first and second DCI formats are transmitted in a TDD scheme and a bit size of a Rank field included in the payload of the second DCI format is set to 0 bit, a PQI field and a SRS field may be deleted from the payload of the first DCI format, the payload of the first DCI format is transmitted and, additionally, at least one field selected from among an NDI field, an MCS 2 field, an RV 2 field, an HARQ field, a TPC field, a DAI field, and a CIF may be deleted or a bit size of the at least one field may be reduced.

When a PTM-TNTI is separately defined to indicate PQI information included in the deleted PQI field, the first DCI format may be scrambled by the PTM-RNTI and transmitted.

Information about the PTM-RNTI corresponding to the PQI information may be transmitted via higher layer signaling.

In another general aspect of the present invention, there is provided a method for transmitting Downlink Control Information (DCI) by a base station in a wireless communication system, the method including: a Radio Frequency (RF) unit configured to transmit and receive a radio signal; and a processor configured to control the RF unit, wherein the base station is configured to: allocate a resource for data transmission; transmit, in a first DCI format, DCI including scheduling information about the allocated resource; and transmit data according to the scheduling information, wherein, when the DCI includes scheduling information about multicast/broadcast data, the DCI is transmitted in a payload size, which is adjusted to be identical to a payload size of a preset second DCI format, through a Common Search Space (CSS), and wherein, when the DCI includes scheduling information about unicast data, the first DCI format is transmitted in a payload size, which is not adjusted, through a UE-specific Search Space (USS).

Advantageous Effects

According to an embodiment of the present invention, it is possible to minimize the number of times for a UE to perform Blind Detection (BD) of different-format DCI which is transmitted through a Common Search Space (CSS).

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows patterns of reference signals mapped to pairs of downlink resource blocks in a wireless communication system to which an embodiment of the present invention may be applied.

FIG. 6 shows an uplink subframe including sounding reference signal symbols in a wireless communication system to which an embodiment of the present invention may be applied.

FIG. 7 shows an example of component carriers and carrier aggregation in a wireless communication system to which an embodiment of the present invention may be applied.

FIG. 8 shows an example of a structure of a subframe according to cross-carrier scheduling in a wireless communication system to which an embodiment of the present invention may be applied.

FIG. 9 shows one example of generating and transmitting 5 SC-FDMA symbols during one slot in the wireless communication system to which the present invention may be applied FIG. 10 shows a carrier aggregation-based CoMP system in a wireless communication system to which an embodiment of the present invention may be applied.

FIG. 11 shows elements regarding a scheme of direct communication between terminals (D2D).

FIG. 12 shows an embodiment of configuration of resource units.

FIG. 13 shows V2X communication according to an embodiment of the present invention.

FIG. 14 is a diagram showing Downlink Control Information (DCI) formats (2A, 2C, and 2D) in Frequency Division Duplex (FDD).

FIG. 15 is a diagram showing DCI formats (2A, 2C, and 2D (in Time Division Duplex (TDD).

FIG. 16 is a flowchart illustrating a Single-Cell Point-to-Multiple point (SC-PTM) transmission method according to an embodiment of the present invention.

FIG. 17 shows a block configuration of a wireless communication apparatus according to an embodiment of the present invention.

FIG. 18 is a diagram illustrating an example of one TP set in which multiple TPs transmitting physical downlink shared channels (PDSCHs) is included.

BEST MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.
CRS: cell-specific reference signal
MBSFN RS: multicast-broadcast single-frequency network reference signal
UE-specific RS or demodulation RS (DM-RS)
PRS: positioning reference signal
CSI-RS: channel state information reference signal
One RS is transmitted for each downlink antenna port.

The CRS is transmitted in every downlink subframe within a cell supporting PDSCH transmission. The CRS is transmitted in one or more of antenna ports 0 to 3. The CRS is defined only in $\Delta f=15$ kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports $p=5$, $p=7$, $p=8$ or $p=7$, 8, . . . , u+6. Here, u is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in $\Delta f=15$ kHz.

The CSI-RS is transmitted in 1, 2, 4, or 8 number of antenna ports using $p=15$, $p=15$, 16, $p=15$, . . . , 18, and $p=15$, . . . , 22, respectively.

The CSI-RS is defined only in $\Delta f=15$ kHz.

The reference signal (RS) will be described in more detail.

The CRS is an RS for obtaining information regarding a state of a channel shared by every terminal within a cell and measuring handover. The DM-RS is used for data demodulation only for a specific UE. Information for demodulation and channel measurement may be provided using such reference signals. That is, the DM-RS is used only for data demodulation, and the CRS is used for both purposes of channel information obtaining and data demodulation.

The receiving side (i.e., UE) measures a channel state from the CRS, and feeds back an indicator related to channel quality such as a CQI (Channel Quality Indicator), a PMI (Precoding Matrix Index), a PTI (Precoding Type Indicator) and/or an RI (Rank Indicator) to the transmitting side (i.e., Base Station). Meanwhile, a reference signal related to feedback of channel state information (CSI) may be defined as a CSI-RS.

The DM-RS may be transmitted through resource elements when data on a PDSCH is required to be demodulated. The UE may receive whether a DM-RS is present through a higher layer, and may be valid only when the corresponding PDSCH is mapped. The DM-RS may be called a UE-specific RS or a demodulation RS (DMRS).

FIG. 5 illustrates a reference signal pattern mapped to a downlink resource block pair in a wireless communication system to which an embodiment of the present invention may be applied.

Referring to FIG. 5, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 10(a)) and has a length of 12 OFDM symbols in the case of an extended CP (FIG. 10(b)). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead may be provided according to a deployment scenario.

A sixteenth array completely turns off the switch of an SRS within a cell, which is mostly suitable for a serving cell which provides service to high-speed UEs.

FIG. 6 illustrates an uplink subframe including the symbols of a Sounding Reference Signal (SRS) in a wireless communication system to which an embodiment of the present invention may be applied.

Referring to FIG. 6, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontinuous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and carrier aggregation in a wireless communication system to which an embodiment of the present invention may be applied.

(a) of FIG. 7 illustrates a single carrier structure used in an LTE system. Component carriers include a DL CC and a UL CC. One CC may have a frequency range of 20 MHz.

(b) of FIG. 7 illustrates a carrier aggregation structure used in an LTE_A system. (b) of FIG. 7 illustrates a case in which three CCs having a frequency size of 20 MHz are combined. Three DL CCs and three UL CCs are provided, but there is no limitation in the number of DL CCs and UL CCs. In the case of carrier aggregation, the UE may simultaneously monitor three CCs, receive downlink signal/data, and transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specifically, UE group-specifically, or cell-specifically.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 8 shows an example of a structure of a subframe according to cross-carrier scheduling in a wireless communication system to which an embodiment of the present invention may be applied.

Referring to FIG. 8, in a DL subframe for an LTE-A UE, three DL CCs are combined and DL CC 'A' indicates a case set with a PDCCH monitoring DL CC. In case where a CIF is not used, each DL CC may transmit a PDCCH scheduling a PDSCH thereof without a CIF. Meanwhile, in case where the CIF is used through higher layer signaling, only one DL CC 'A' may transmit the PDCCH scheduling a PDSCH thereof or a PDSCH of another CC using the CIF. Here, DL CC 'B' and 'C' not set as PDCCH monitoring DL CCs do not transmit the PDCCH.

PDCCH Transmission

The eNB determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

A plurality of PDCCHs may be transmitted in one subframe. That is, a control region of one subframe includes a plurality of CCEs having an index 0~N_(CCE,k)−1. Here, N(CCE, k) denotes a total number of CCE s within a control region of a kth subframe. The UE monitors a plurality of PDCCHs in each subframe.

Here, monitoring refers to UE attempting to decode PDCCHs according to a monitored PDCCH format. In a control region allocated within a subframe, the BS does not provide information regarding where a corresponding PDCCH is present. In order to receive a control channel transmitted from the BS, the UE searches for a PDCCH thereof by monitoring an aggregation of PDCCH candidates within a subframe because the UE does not know in which position, at which CCE aggregation level, or in which DCI format, the PDCCH thereof is transmitted. This is called blind decoding/detection (BD). Blind decoding refers to a method by which the UE de-masks a UE ID thereof in a CRC portion and checks a CRC error to determine whether a corresponding PDCCH is a control channel of the UE.

In the active mode, the UE monitors a PDCCH of each subframe to receive data transmitted to the UE. In a DRX mode, the UE wakes up in a monitoring section of each DRX period to monitor a PDCCH in a subframe corresponding to a monitoring section. A subframe in which PDCCH is monitored is called a non-DRX subframe.

In order to receive the PDCCH transmitted to the UE, the UE should perform blind decoding on all CCEs present in the control region of the non-DRX subframe. Since the UE does not know which PDCCH format will be transmitted, the UE should decode all PDCCHs at a possible CCE aggregation level until the blind decoding of the PDCCH is successful in every non-DRX subframe. Since the UE does not know how many CCEs the PDCCH for itself uses, the UE should attempt detection at all possible CCE aggregation levels until the blind decoding of the PDCCH is successful. That is, the UE performs blind decoding by each CCE aggregation level. That is, the UE first attempts at decoding at a CCE aggregation level unit by 1. If decoding fails, the UE attempts at decoding at the CCE aggregate level unit by 2. Thereafter, the UE attempts at decoding the CCE aggregation level unit by 4 and the CCE aggregation level unit by 8 again. Also, the UE attempts at blind decoding on all four C-RNTI, P-RNTI, SI-RNTI and RA-RNTI. In addition, the UE attempts at blind decoding on all DCI formats to be monitored.

In this manner, if the UE attempts at blind decoding by every CCE aggregation level for all DCI formats to be monitored for all possible RNTIs, the number of detection attempts will be excessively increase, and thus, in the LTE system, a search space (SS) concept is defined for blind decoding of the UE. Search space refers to a PDCCH candidate set for monitoring, and may have a different size according to each PDCCH format.

The search space may include a common search space (CSS) and a UE-specific/dedicated search space (USS). In the case of the common search space, all terminals may know a size of the common search space, but the UE-specific search space may be set individually for each terminal. Accordingly, the UE should monitor both the UE-specific search space and the common search space in order to decode the PDCCH, and thus, the UE performs blind decoding (BD) at a maximum of 44 times in one sub-frame. Here, blind decoding performed in accordance with different CRC values (e.g., C-RNTI, P-RNTI, SI-RNTI, RA-RNTI) is not included.

Due to the small search space, it may happen that eNB fails to secure the CCE resources for transmitting the PDCCH to all the UEs to which the PDCCH is to be transmitted within a given subframe. This is because resources remaining after the CCE location are allocated may not be included in the search space of the specific UE. In order to minimize such barriers that may continue in a next sub-frame, a UE-specific hopping sequence may be applied to a starting point of the UE-specific search space.

Table 3 shows a size of the common search space, and a size of the UE-specific search space.

TABLE 3

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to alleviate the computational load of the UE according to the number of attempts at blind decoding, the UE does not simultaneously perform search according to all defined DCI formats. In detail, the UE may always perform search for DCI format 0 and 1A in the UE-specific search space. At this time, DCI formats 0 and 1A have the same size, but the UE may differentiate between the DCI format using a flag (for format 0/format 1A differentiation) used for differentiating between DCI formats 0 and 1A included in the PDCCH. Also, according to the PDSCH transmission mode set by the eNB, a DCI format other than the DCI formats 0 and 1A may be required for the terminal. For example, there are DCI formats 1, 1B, and 2.

In the common search space, the UE may search the DCI formats 1A and 1C. Also, the UE may be configured to search for DCI format 3 or 3A, and DCI formats 3 and 3A have the same size as DCI formats 0 and 1A, but the UE may differentiate the DCI formats using the CRC scrambled by an identifier other than a UE-specific identifier.

A search space S_k^(L) refers to a PDCCH candidate set according to an aggregation level L∈{1,2,4,8}. A CCE according to a PDCCH candidate set m of a search space may be determined by Equation 4 below.

$$L \cdot \{(Y_k + m) \bmod \lfloor N_{CCE,k}/L \rfloor\} + i \qquad \text{[Equation 1]}$$

Here, M_(L) denotes the number of PDCCH candidates according to a CCE aggregation level L for monitoring, and m=0~M^(L)−1. i denotes an index designating an individual CCE in each PDCCH candidate, and i=0~L−1.

As described above, the UE monitors both the UE-specific search space and the common search space to decode the PDCCH. Here, the common search space (CSS) supports PDCCHs having an aggregation level {4, 8}, and the UE-specific search space (USS) supports PDCCHs having an aggregation level {1, 2, 4, 8}

Table 4 shows PDCCH candidates monitored by the UE.

TABLE 4

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, in the case of the CSS, $Y_k$ is set to 0 for two aggregation levels L=4 and L=8. Meanwhile, in the case of the UE-specific SS (USS), $Y_k$ is defined as expressed by Equation 5 for an aggregation level L.

$$Y_k = (A \cdot Y_{k-1}) \bmod D \quad \text{[Equation 2]}$$

Here, $Y_{-1} = n_{RNTI} \neq 0$, and an RNTI value used for $n_{RNTI}$ may be defined as one of identifiers of the UE. Also, A=39827, D=65537, and k=$\lfloor n_s/2 \rfloor$. Here, n_s denotes a slot number (or index) in a radio frame.

Block Spreading Technique

The block spreading technique is a scheme that modulates transmission of the control signal by using the SC-FDMA scheme unlike the existing PUCCH format 1 series or 2 series. As illustrated in FIG. 11, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 9 illustrates one example of generating and transmitting 5 SC-FDMA symbols during one slot in the wireless communication system to which the present invention may be applied.

In FIG. 9, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 9, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

CA-Based CoMP Operation

In system subsequent to LTE, cooperative multi-point (CoMP) transmission may be implemented using a carrier aggregation (CA) function in LTE.

FIG. 10 is a diagram illustrating a carrier aggregation-based CoMP system in a wireless communication system to which an embodiment of the present invention may be applied.

FIG. 10 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 10 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1 B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 5 illustrates a PDCCH and PDSCH configured by an SI-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 6 illustrates a PDCCH and PDSCH configured by a P-RNTI.

TABLE 6

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 7 illustrates a PDCCH and PDSCH configured by an RA-RNTI.

TABLE 7

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
UE does not receive a PDSCH RB transmitted in the antenna port 5 even in any subframe in which the number of OFDM symbols for a PDCCH having a common CP is 4.
If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.
UE does not receive a PDSCH RB transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

In the case of the frame structure type 2,
UE does not receive a PDSCH RB transmitted in the antenna port 5 even in any subframe in which the number of OFDM symbols for a PDCCH having a common CP is 4.
If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.
If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.
If a common CP is configured, UE does not receive a PDSCH in the antenna port 5 in which distributed VRB resource allocation has been assigned within a special subframe in an uplink-downlink configuration #1 or #6.
UE does not receive a PDSCH transmitted in the antenna port 7 to which distributed VRB resource allocation has been assigned.
UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 8 illustrates a PDCCH and PDSCH configured by a C-RNTI.

TABLE 8

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |

TABLE 8-continued

| TRANSMIS-SION MODE | DCI FORMAT | SEARCH SPACE | METHOD FOR SENDING PDSCH CORRESPONDING TO PDCCH |
|---|---|---|---|
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | large delay CDD or transmit diversity |
| Mode 4 | DCI format 1A | common and UE-specific by a C-RNTI | transmit diversity |
| | DCI format 2 | UE-specific by a C-RNTI | closed-loop spatial multiplexing or transmit diversity |
| Mode 5 | DCI format 1A | common and UE-specific by a C-RNTI | transmit diversity |
| | DCI format 1D | UE-specific by a C-RNTI | multi-user MIMO |
| Mode 6 | DCI format 1A | common and UE-specific by a C-RNTI | transmit diversity |
| | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
| | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 9 illustrates a PDCCH and PDSCH configured by an SPS C-RNTI.

TABLE 9

| TRANSMIS-SION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 9. The PDSCH corresponding to the PDCCH(s) is scrambling-initialized by the temporary C-RNTI.

Table 10 illustrates a PDCCH and a PDSCH configured by a temporary C-RNTI.

TABLE 10

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |

TABLE 10-continued

| DCI FORMAT | SEARCH SPACE | METHOD FOR SENDING PDSCH CORRESPONDING TO PDCCH |
|---|---|---|
| DCI format 1 | UE-specific by a temporary C-RNTI | If the number of PBCH antenna ports is 1, a single antenna port, a port 0 is used, and if not, transmit diversity |

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports.

D2D (Device-to-Device) Communication

FIG. 11 shows elements regarding a scheme of direct communication between terminals (D2D).

In FIG. 11, the UE refers to a terminal of a user, and in case where network equipment such as an eNB transmits and receives a signal according to a communication scheme with a UE, the corresponding network equipment may also be regarded as a UE. Hereinafter, UE1 may select a resource unit corresponding to a specific resource within a resource pool indicating a set of resources and operates to transmit a D2D signal using the corresponding resource unit. A UE2, which is a receiving UE thereof, configures a resource pool in which a UE1 may transmit a signal and detects a signal of the UE1 in the corresponding pool. Here, the resource pool may be notified by a BS when the UE1 is within a connection range of the BS, and may be informed by another UE or determined as a predetermined resource when it is outside the connection range of the BS. In general, a resource pool may include a plurality of resource units, and each UE may select one or a plurality of resource units to use the same to transmit a D2D signal thereof.

FIG. 12 shows an embodiment of configuration of resource units.

Referring to FIG. 12, a total of N_F*N_T resource units may be defined by dividing the entire frequency resources into N_F and the entire time resources into N_T. Here, it may be expressed that the corresponding resource pool is repeated at intervals of N_T subframes. Characteristically, one resource unit may appear repeatedly periodically as shown in the drawing. Or, an index of a physical resource unit to which one logical resource unit is mapped may change in a predetermined pattern over time in order to obtain a diversity effect in the time or frequency domain. In this resource unit structure, the resource pool may refer to a set of resource units which may be used by the UE to transmit the D2D signal.

The resource pools described above may be subdivided into various kinds. First, the resource pools may be divided according to the content of a D2D signal transmitted in each resource pool. For example, the content of the D2D signal may be divided as follows, and a separate resource pool may be configured for each signal.

Scheduling assignment (SA): A signal including a position of a resource used for transmission of a D2D data channel performed by each transmitting UE, and information such as a modulation and coding scheme (MCS) required for demodulating other data channels, a MIMO transmission scheme and/or timing advance, and the like. This signal may also be multiplexed and transmitted along with the D2D data on the same resource unit. In this disclosure, the SA resource pool may refer to a pool of resources in which the SA is multiplexed and transmitted with the D2D data, and may also be referred to as a D2D control channel.

D2D data channel: A resource pool used by a transmitting UE to transmit user data using a resource designated through an SA. When it is possible to be multiplexed and transmitted together with the D2D data on the same resource unit, only a D2D data channel without the SA information may be transmitted in the resource pool for the D2D data channel. In other words, the resource element, which was used to transmit the SA information on the individual resource unit in the SA resource pool, may be used to transmit D2D data in the D2D data channel resource pool.

Discovery channel: A resource pool for a message to which a transmitting UE transmits information such as its own ID, or the like, so that a neighboring UE may discover the transmitting UE.

Contrary to the above case, even when the content of the D2D signal is the same, different resource pools may be used depending on the transmission/reception properties of the D2D signal. For example, even the same D2D data channel or a discovery message may be classified into different resource pools depending on a transmission timing determination scheme of the D2D signal (for example, whether it is transmitted at a time point when a synchronization reference signal is received or whether it is transmitted by applying a certain timing advance at the corresponding time point), a resource allocation scheme (e.g., whether the eNB designates transmission resource of an individual signal to an individual transmitting UE or whether an individual transmitting UE selects an individual signaling transmission resource by itself from the pool), a signal format (e.g., the number of symbols of each D2D signal which occupy one subframe, or the number of subframes used for transmission of one D2D signal), signal strength from the eNB, strength of transmission power of the D2D UE, and the like.

In this disclosure, for the purposes of description, a method in which the eNB directly indicates a transmission resource of a D2D transmitting UE in D2D communication will be called/defined as Mode 1 and a method in which a transmission resource region is set in advance, the eNB designates a transmission resource region, and a UE directly selects a transmission resource will be called/defined as Mode 2. In the case of D2D discovery, a case in which the eNB directly indicates resource will be called/defined as Type 2 and a case in which the UE directly selects transmission resource in a preset resource region or a resource region indicated by the eNB will be called/defined as Type 1.

The afore-mentioned D2D may also be called a sidelink, the SA may be called a physical sidelink control channel (PSCCH), a D2D synchronization signal may be called a sidelink synchronization signal (SSS), a control channel for transmitting most basic information prior to D2D communication transmitted together with the SSS may be called a physical sidelink broadcast channel (PSBCH), or a PD2DSCH (Physical D2D synchronization channel) by a different name. A signal indicating that a specific terminal is in its vicinity, which may include an ID of a specific terminal, may be called a physical sidelink discovery channel (PSDCH).

In D2D of Rel. 12, only a D2D communication UE transmits the PSBCH together with the SSS, and therefore, measurement of the SSS is performed using a DMRS of the PSBCH. An out-coverage UE measures the DMRS of the PSBCH and measures a reference signal received power (RSRP) of the signal to determine whether the UE will become a synchronization source.

Single-Cell Point-to-Multipoint (PTM) Transmission

1. Search Space for Single Cell (SC)-PTM

The SC-PTM has been introduced primarily to support Mission Critical Push To Talk (MCPTT). TS 22.179 suggests the following guidance regarding expansion of the MCPTT.

The MCPTT service may support a range of 36 to 150 simultaneous MCPTT Group Calls in every cell of the MCPTT system per regional regulatory requirement.

If all the MCPTT Group Calls are voice calls (which corresponds the most common traffic type) and a SC-PTM scheduling cycle of a voice call is 40 ms (in the case of 80 ms scheduling cycle, it is not possible to satisfy 1550 ms E2E media transmission delay requirement for MCPTT) is assumed, a system needs to support 9 to 37 PDCCHs scrambled by a Group-RNTI per radio frame.

Considering the above description, the system needs to support 9 to 37 PDCCHs (which are scrambled by a Group RNTI per radio frame for the purpose of MCPTT), and the SC-PTM scheduling cycle may be assumed to be 40 ms.

2. Analysis on Capability of the Existing Common Search Space (CSS)

In the case of the SC-PTM, transmission is performed toward a group of UEs, so a CSS which carries PDCCHs scrambled by a Group-RNTI may be considered.

As shown in the following Table 11, the existing CSS may include 16 CCEs. In the case where a system bandwidth is specified, for example, to be less than 10 MHz, 16 valid CCEs for CSS are hardly guaranteed. In this case, even a PDSCH capability may be limited.

TABLE 11

| | Search space | | |
|---|---|---|---|
| Type | Aggregation level (AL) | Size [CCEs] | Number of PDCCH candidates |
| Common | 4 | 16 | 4 |
| | 8 | 16 | 2 |

In the following Table 12, a capability of the existing CSS may be expressed as the number of PDCCHs per radio frame. In Table 12, AL may indicate an Aggregation Level. As the number of DL subframes in a TDD system is less than in a FDD system, a capability of the existing CSS in the TDD system may be lower than in the FDD system.

TABLE 12

|  | FDD | TDD (Config#0) | TDD (Config#1) | TDD (Config#2) |
|---|---|---|---|---|
| AL 4 | 40 | 16 | 24 | 32 |
| AL 8 | 20 | 8 | 12 | 16 |

Recently, DCI-format 1A/1C scrambled by a SI-RNTI/P-RNTI/RA-RNTI, DCI-format 3/3A scrambled by a TPC-PUCCH-RNTI/TPC-PUSCH-RNTI, DCI-format 0 scrambled by a temporary C-RNTI may be transmitted in a CSS. 3 or 4 DCIs may be required on average in a CSS for each radio frame. If it is assumed that four PDCCH per radio frame are transmitted, the number of valid PDCCH candidates in the existing CSS for SC-PTM transmission may be derived, as shown in the following Table 13.

TABLE 13

|  | FDD | TDD (Config#0) | TDD (Config#1) | TDD (Config#2) |
|---|---|---|---|---|
| All PDCCHs with AL4 | 36 | 12 | 20 | 28 |
| All PDCCHs with AL8 | 16 | 4 | 8 | 12 |
| PDCCHs for SC-PTM with AL 4, other PDCCHs with AL 8 | 32 | 8 | 16 | 24 |

In this step, the fact that the existing CSS for SC-PTM transmission is sufficient may be considered. According to system-level evaluation, for 2.5% of UEs and 7% of UEs in a cell, a PDCCH with AL 8 is set in the general 3GPP case 1 scenario and the general 3GPP case 3 scenario. If a range condition 95% for SC-PTM transmission is assumed, using PDSCCHs with AL 4 may be sufficient in the general 3GPP case 1 Scenario. PDCCHS with AL 8 may be needed in the general 3GPP case 3 scenario, but using PDCCHs with AL 4 may be desirable in most cases.

As shown in Table 13, if AL4 is provided to every PDCCH scrambled by a G-RNTI, the existing CSS may provide a capability sufficient for SC-PTM of the FDD system. In the case of TDD system, the existing CSS may be limited only in specific UL/DL settings, and a PDSCH capability may be limited as well in proportion to a less number of subframes.

Considering the above description, the existing CSS has a capability sufficient for CS-PMM transmission in most cases. Therefore, the CSS may be used for SC-PTM transmission.

If the capability of the existing CSS is limited in SC-PTM transmission and needs to be enhanced, potential solutions, such as introduction of an additional search space and use of a SPS for SC-PTM, may be suggested. To select an appropriate solution from those solutions, a UE's complexity regarding PDCCH blind decoding and blocking of a possible PDCCH may be considered as two important factors.

If an additional search space is supported, a base station may have flexibility to determine whether or not to set the additional search space for SC-PTM. For example, the additional search space may be set only when there is a great number of Group Calls.

3. DCI Discussion for SC-PTM Scheduling

Transmission Mode (TM) 1, 2, and 3 may support SC-PTM transmission. Currently, DCI format 1A/1 is used for TM 1 and TM 2, and DCI format 1A/2A is used for TM3. However, DCI format 1/2A cannot be transmitted in the existing CSS. In the case of SC-PTM transmission, even though DCI format 1 for TM 1 and TM 2 does not exists, a large delay CDD is not supported. To support TM 3 having a large delay CDD in a CSS, the following two methods may be considered.

1) Method 1: Transmission of DCI Format 2A in CSS

If a UE is set to decode a PDCCH having a CRC scrambled by a G-RNTI by an higher layer, the UE may decode the PDCCH and decode a PDSCH corresponding to the PDCCH according to one of combinations defined in the following Table 14.

TABLE 14

| DCI format | Search Space | Transmission scheme of PDSCH corresponding to PDCCH |
|---|---|---|
| DCI format 1C | Common | If there is one PBCH antenna port, single-antenna port and port 0 is used: otherwise, transmission diversity is used |
| DCI format 1A | Common | If there is one PBCH antenna port, single-antenna port and port 0 is used: other wise, transmission diversity is used |
| DCI format 2A | Common | Large delay CDD or transmission diversity |

Initial setting for scrambling PDSCHs corresponding to these PDCCHs may be performed by a G-RNTI. DCI format 1C may be used in TM1 and TM2, and may have a lower overhead than DCI format 1A.

When Method 1 is applied, change may occur in at least RAN 1. However, because an additional DCI payload size is introduced in the CSS, only additional 6 blind decoding may be performed additionally.

2) Method 2: Use of DCI Format 1A for Large Delay CDD

If a UE is set to decode a PDCCH having a CR scrambled by a G-RNTI by an higher layer, the UE may decode the PDCCH and decode a PDSCH corresponding to the PDCCH according to one of combinations defined in the following Table 15. Initial setting of scrambling PDSCHs corresponding to these PDCCH may be performed by the G-RNTI.

TABLE 15

| DCI format | Search Space | Transmission scheme of PDSCH corresponding to PDCCH |
|---|---|---|
| DCI format 1C | Common | If there is one PBCH antenna port, single-antenna port and port 0 is used: otherwise, transmission diversity is used |
| DCI format 1A | Common | If there is one PBCH antenna port, single-antenna port and port 0 is used: other wise, transmission diversity is used |

Initial setting of scrambling PDSCHs corresponding to these PDCCH may be performed by the G-RNTI.

In addition, to support a large delay CDD, the following three types of information needs to be considered.

Two MCSs in two Transport Blocks (TBs)

For simplicity, the same MCS may be used for two TBs, and this is equally maintained in DCI format 1A.

Precoding information

Recently, a precoding information field does not exists for transmission using two antenna ports, and a two-bit precoding information field may be configured for transmission using four antenna ports. If a large delay CDD is set only when two CRS antenna ports are used, precoding information does not need to be added in DCI format 1A.

Furthermore, if it is necessary to support a large delay CDD having four antenna ports, the 2-bit precoding information may be needed. Since a HARQ-ACK feedback for SC-PTM transmission is not supported, bits redundant with bits of a TPC command for a PUCCH may be reused to indicate precoding information.

Transport Block for codeword swap flag

A transport block for codeword mapping may be defined, and a codeword swap flag needs to be added to DCI format 1A.

In the case of Method 2, change may occur in at least RAN 1. Furthermore, the number of times to perform PDCCH blind decoding may be maintained to be the same in a CSS.

Considering the above description, DCI format 1A may be used for scheduling of SC-PTM transmission having a large delay CDD.

4. Discussion about Simultaneous Reception of a Plurality of Services in Different Transmission Modes Through an additional standardization process and an implementation operation, it is possible to support simultaneous receipt of unicast signals or at least one SC-PTM transmission in one subframe of one carrier by specific UEs. However, simultaneous reception by all UEs are not possible.

In this case, for SC-PTM enabled UEs, supporting simultaneous reception of a plurality of SC-PTM transmissions in one subframe of one carrier may not be an essential function. For MIMO/CA enabled UEs, supporting simultaneous reception of a plurality of SC-PTM transmissions in one subframe of one carrier may be a choice of selection.

As only TM 1 and TM 2 are set for non-MINO enabled UEs, a non-MIMI UE having a parallel reception capability is able to support simultaneous reception of a plurality of services having TM 1 and TM2. As TM 3 may be additionally set for the MIMO enabled UEs, a MIMO enabled UE having a parallel reception capability is able to support simultaneous reception of a plurality of services having TM 1, TM 2, and TM 3.

The recent load of the conventional CSS may be found by analyzing the number of DCIs requested by a radio frame in Table 16. If all available DCI formats are transmitted in one radio frame, 6 or 7 DCIs may be transmitted at the maximum, and this may result in increasing the load of the CSS.

TABLE 16

| DCI formats | Purpose | Number of required DCIs in a radio frame |
|---|---|---|
| Format 0 | Trigger random access procedure for each packet arrival | 0.03 Assuming medium arriving rate (uplink and downlink lambda = 1.5) |
| Format 3/3A | Group UL PC (TPC-RNTI) | 1 Supporting group UL PC for over 10/20 users' periodical UL transmissions (UL SPS, SRS etc) |
| Format 1C/1A | SIB 1 schedule (SI-RNTI) | 0.5 (Occurs in every even radio frame) |
| | SIB i (i >= 2) (SI-RNTI) | 1~2 Assuming SI window num = 4; Num of SI scheduling within window = 4; SI period = 8~16 radio frames |
| | Paging schedule(P-RNTI) | 1/32 Assuming minimum default paging period |
| | Random access response (RA-RNTI) | 0.03 Assuming medium arriving rate (uplink and downlink lambda = 1.5) |

The base station may distribute such transmissions to different radio frames, and, as a result, three or four DCIs may be required on average in a CSS for one radio frame.

Considering the above description, SC-PTM transmission aims to support broadcast/multicast transmission so as to allow a plurality of UEs to receive data, transmitted from a base station, simultaneously/together. To this end, a SC-PTM scheduling message of DCI format 2A may be typically transmitted through a CSS, and a plurality of UEs may detect the corresponding scheduling message. The SC-PTM scheduling message may indicate a message including scheduling information for SC-PTM transmission and reception. Using/based on the detected scheduling message, the UEs may receive broadcast/multicast data.

However, DCI format 2A cannot be transmitted in a CSS according to the current standard, so, as one of ways to solve this problem, there has been proposed a method of enabling the DCI format 2A to be transmitted in a CSS (however, the number of times for a UE to perform BD increases). In this case, the DCI format 2A is a transmission method by use of a large CDD of TM3, and, as described above, supporting TM 1 to TM 3 may be considered in the current SC-PTM operation.

However, a (DMRS-based) broadcast/multicast transmission-related method proposed in this specification is not limited to TM 1 to MT3, and may be applied/supported even in an advanced TM. For example, when a next-generation DMRS-based TM is supported for broadcast/multicast transmission, the technology proposed in this specification may be applied to V2X (vehicle-to-vehicle/infrastructure/pedestrian) communications more particularly, a V2I (vehicle-to-infrastructure) communications) which considers the following types. However, it is merely exemplary, and the technology proposed in this specification may be applied to various scenarios of various wireless communication systems. Hereinafter, for convenience of explanation, the present invention is described mainly about the case where the present invention is applied to V2X communications.

The aforementioned typical three V2X services are as follows.

V2V (vehicle-to-Vehicle): Communications between vehicles.

V2I (Vehicle-to-Infrastructure): Communications between a vehicle and a roadside unit (RSU) which is implemented in an eNB or a stationary UE.

V2P (Vehicle-to-Pedestrian): Communications between a vehicle and a device carried by an individual (a pedestrian, a cyclist, a driver, or a passenger)

FIG. 13 is a diagram illustrating an example of V2X communications according to an embodiment of the present invention.

FIG. 13 shows an example I which communication is performed as vehicles (or called UEs) transmit and receive a Cooperative Awareness Message (CAM)/a Decentralized Environmental Notification Message (DENM) or communication is performed via an infrastructure network of an RSU or the like.

As such, a specific network node, such as an LTE RSU, may wishes to transmit specific message (for example, a message about traffic information, driving related information, accident information, collision warning information, or the like) in the form of PTM to a plurality of UEs (for example, vehicles). In this case to enhance a transmission throughput and transmission efficiency, a DMRS-based enhanced transmission mode (for example, TM 9 and 10) may be applied for PTM transmission.

At this point, in the case where TM 3-based DCI format 2A is allowed in a CSS, as described above, if transmission is performed by setting a length of a DCI format, which is to be transmitted based on the DMRS-based enhanced transmission mode, to the same length of the DCI format 21, a UE may have the advantage that the number of times to perform BD on another DCI format is not increased.

More specifically, for example, applying TM 9 and TM 10 as enhanced transmission modes for PTM transmission may be assumed. In this case, a network mode may perform transmission by setting the payload size of the DCI format 2C based on TM 9 to be the same as the payload size of the DCI format 2D based on TM 10. In this case, the UE may present increase of the number of times to perform BD on the DCI format 2C and the DCI format 2D, except for the DCI format 2A transmitted in the CSS. That is, as the DCI format 2C/2D are transmitted in the same payload size of the DCI format 2A, a UE is able to perform BD on the DCI format 2C/2D in the same manner as when performing BD on the DCI format 2A, and therefore, it is not necessary to perform additional BD to detect the DCI format 2C/2D.

Considering the above description, to minimize the number of time that a UE performs BD, this specification proposes a method in which a target DCI format is set as a reference and the payload size of other DCI formats is set to the same as the payload size of the target DCI format to be (PTM) transmitted. Hereinafter, for convenience of explanation, this specification will be described mainly about the case of performing PTM transmission by setting the payload size of the DCI format 2C/2D to be the same as the payload size of the DCI format 2A. However, the present invention is not limited thereto, and various DCI formats may be set as a target DCI format in PTM transmission, and a DCI format to be adjusted to have the same payload size of the target format may be set variously.

Figure 14:
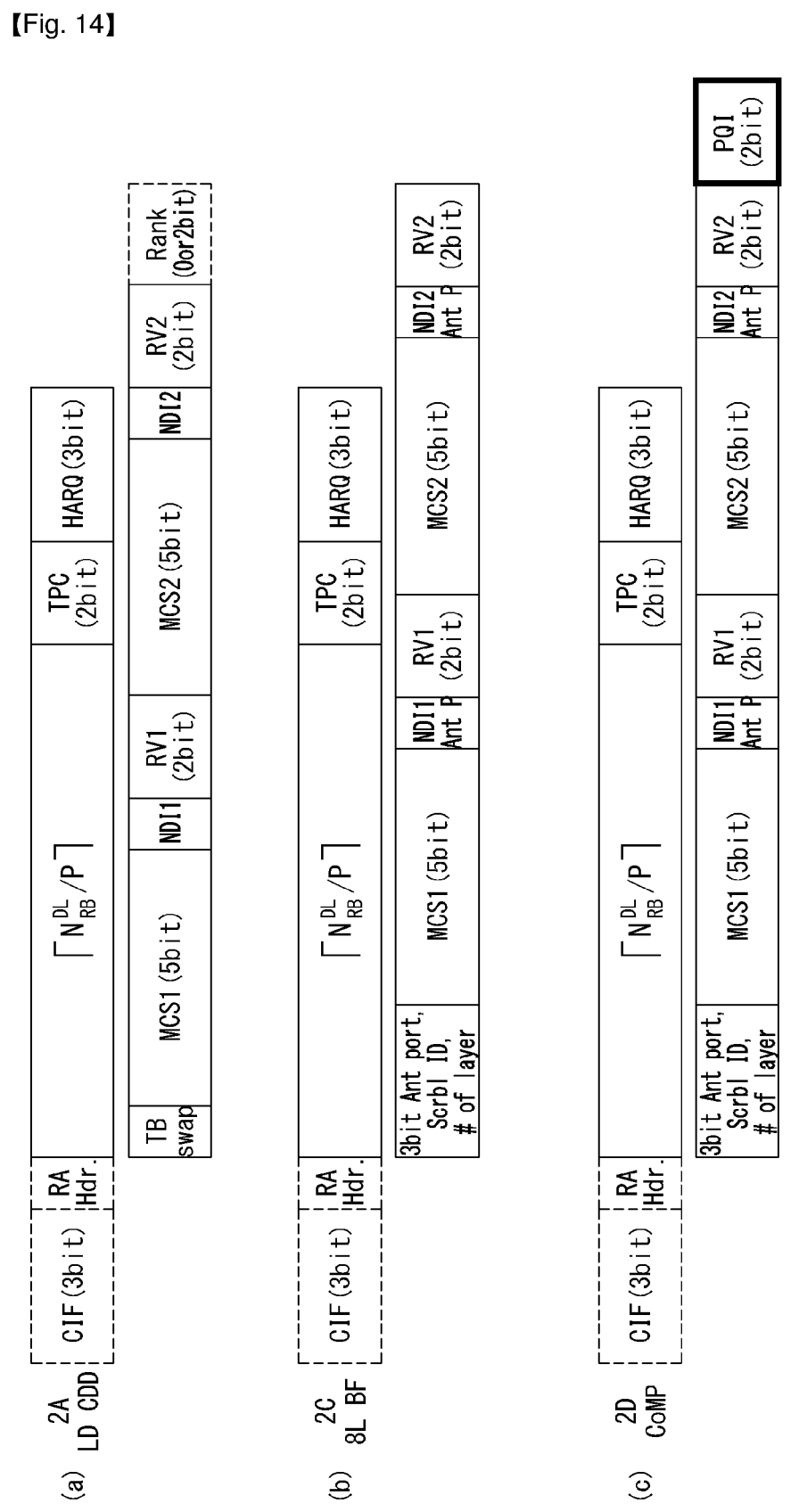

FIG. 14 shows DCI formats (21, 2C, and 2D) in FDD. FIG. 15 shows DCI formats (2A, 2C, and 2D) in TDD. Hereinafter, embodiments of adjusting of a payload size will be described with reference to the drawings.

1. Embodiment in which TM 9 Having DCI Format 2C is Supported for TDD-Type PTM Transmission.

Referring to FIGS. 14(a) and 14(b), the payload size of the DCI format 2A and the payload size of the DCI format 2C are set equally (especially when the Rank field in the DCI format 2A is processed into 2 bits). Thus, the DCI format 2C in FDD may be defined/set to be transmitted in a CSS without the need of additionally changing the payload size.

In this case, the DCI format 2C may not be masked by the conventional C-RNTI (or not be CRC-scrambled) but may be masked by a new RNTI (which is hereinafter referred to as a PTM-RNTI) to be PTM-transmitted in a CSS. By performing BD on the DCI format scrambled by the PTM-RNTI in a CSS, a UE may receive PTM transmission data. When PTM transmission and reception is set in the UE or when the UE descrambles the DCI format 2C using a pre-defined PTM-RNTI, the UE may recognize the received DCI of format 2C as a DCI related to broadcast/multicast transmission.

There may be some cases where the payload size of a target DCI format is reduced, for example, when Rank field (0 or 2 bits) of DCI 2A is processed into 0 bits. In this case, the payload size of the DCI format 2C needs to be reduced in accordance with the reduced payload size of the DCI format 2A.

To this end, according to one embodiment, the DCI format 2C may be transmitted with a New Data Indicator (MDI) (2 bits in total) field removed. Due to characteristics of PTM transmission (or multicast/broadcast transmission, in order to reduce system complexity, a plurality of UEs may not additionally transmit ACK/NACK responsive to received PTM-transmitted data, and, in this case, the NDI field may not be necessarily required. Thus, by removing unnecessary NDI fields, it is possible to adjust the payload size of the DCI format 2C to be the same payload size as the DCI format 2A (not including the Rank field).

According to another embodiment, at least one field from among a Modulation and Coding Scheme (MCS) 2 field, a Redundancy Version (RV) 2 field, a HARQ field, a Transmit Power Control (TPC) field, and a Carrier Indicator Field (CIF) field in the DCI format 2C may be deleted or the bit size thereof may be reduced so as to adjust the payload size of the DCI format 2C to be the same payload size of the DCI format 2A. For example, after a MCS 2 field (5 bits) is removed from the DCI format 2C, a zero padding bit in the size of 3 bits may be inserted or the bit size of the MCS 2 field may be reduced from 5 bits to 3 bits.

2. Embodiment in which TM 9 Having the DCI Format 2C is Supported for TDD-Type PTM Transmission.

Referring to FIGS. 15(a) and 15(b), except for a Sound Reference Signal (SRS) field (1 bit), the payload size of the DCI format 2C is the same as a payload size of the DCI format 2A. Thus, this embodiment proposes transmitting the DCI format 2C, from which the SRS field is removed, in a CSS.

In the case of PTM transmission, a SRS may be triggered via a DCI format other than the DCI format 2C (or a SRS field may be transmitted via a different DCI), and thus, an SRS field may not be necessarily required for the DCI format 2C.

In this case, the DCI format 2C may not be masked by the conventional C-RNTI (or not CRC-scrambled) and may be masked by a PTM-RNTI (or CRC scrambled) to be PTM-transmitted in a CSS. By performing BD in a CSS on the DCI format 2C scrambled by the PTM-RNTI, a UE may receive PTM transmission data. When PTM transmission or reception is set in the UE or when the UE descrambles the DCI format 2C using a pre-defined PTM-RMTI, the UE may recognize the received DCI of format 2C as broadcast/multicast transmission-related DCI.

The payload size of a target DCI format may be reduced, for example, when the Rank field (0 or 2 bits) of the DCI format 2A is processed into 0 bit. In this case, the payload size of the DCI format 2C needs to be reduced in accordance with the reduced payload size of the DCI format 2A.

To this end, similarly to the above embodiment regarding FDD, at least one field selected from among a NDI field, a MCS 2 field, a RV2 field, a HARQ field, a TPC field, a Downlink Assignment Index (DAI) field, or a CIF field in the DCI format 2C may be deleted or the bit size of the at least one field may be reduced to adjust the payload size of the DCI format 2C to be the same payload size of the DCI format 2A.

3. Embodiment in which TM 10 Having the DCI Format 2D is Supported for FDD-Type PTM Transmission Referring to FIGS. 14(a) and 14(c), except for a PDSCH RE Mapping and Quasi-co-location Indicator (PQI) field (2 bits), the payload size of the DCI format 2D is the same as the payload size of the DCI format 2A. Thus, this embodiment proposes transmitting DCI format 2D in a CSS with the PQI field removed However, the PQI field corresponds to a Dynamic Indication Field necessarily required for TM 10-based CoMP operation, and thus, if transmission is performed with the PQI field removed, an error may occur in the CoMP operation. Thus, how to additionally transmit, to a UE, the PQI field removed from the DCI format 2D will be described in detail.

In this case, the DCI format 2D may not be masked by the conventional C-RNTI (or not be CRC-scrambled) but may be masked by a PTM-RNTI (or be CRC-scrambled) to be PTM transmitted in a CSS. By performing BD on the DCI format 2D scrambled by the PTM-RNTI in the CSS, a UE may receive PTM transmission data. When PTM transmission and reception is set in the UE or when the UE descrambles the DCI format 2D using a pre-defined PTM-RNTI, the UE may recognize the received DCI of format 2D as broadcast/multicast transmission-related DCI.

The payload size of a target DCI format may be reduced, for example, when the Rank field (0 or 2 bits) of the DCI 2A is processed into 0 bit. In this case, the payload size of the DCI format 2D needs to be reduced in accordance with the reduced payload size of the DCI format 2A.

To this end, at least one field selected from among the NID field, the MCS 2 field, the RV2 field, the HARQ field, the TPC field, and the CIF field in the DCI format 2D may be deleted or the bit size thereof may be reduced so as to adjust the payload size of the DCI format 2D to be the same as the payload size of the DCI format 2A.

4. Embodiment in which TM 10 Having the DCI Format 2D is Supported for TDD-Type PTM Transmission Referring to FIGS. 15(a) and 15(c), except for a SRS field (1 bit) and a PQI field (2 bits), the payload size of the DCI format 2D is the same as the payload size of the DCI format 2A. Thus, this embodiment proposes transmitting the DCI format 2D, from which the SRS field and the PQI field are removed, in a CSS.

In the case of PTM transmission, a SRS may be triggered via a DCI format other than the DCI format 2D (or the SRS field may be transmitted via a different DCI), and thus, the SRS field may not be necessarily required for the DCI format 2D. However, the PQI field corresponds to a Dynamic Indication Field necessarily required for TM 10-based CoMP operation, and thus, if transmission is performed with the PQI field removed, an error may occur in the CoMP operation. Thus, how to additionally transmit, to a UE, the DCI format 2D from which the PQI field is removed will be described in detail.

In this case, the DCI format 2D may not be masked by the conventional C-RNTI (or not be CRC-scrambled) but may be masked by a PTM-RNTI (or be CRC-scrambled) to be PTM transmitted in a CSS. By performing BD on the DCI format 2D scrambled by the PTM-RNTI BD in the CSS, a UE may receive PTM transmission data. When PTM transmission and reception is set in the UE or when the UE descrambles the DCI format 2D using a pre-defined PTM-RNTI, the UE may recognize the received DCI of format 2D as broadcast/multicast transmission-related DCI.

The payload size of a target DCI format may be reduced, for example, when the Rank field (0 or 2 bits) of the DCI 2A is processed into 0 bit. In this case, the payload size of the DCI format 2D needs to be reduced in accordance with the reduced payload size of the DCI format 2A.

To this end, at least one field selected from among the NID field, the MCS 2 field, the RV2 field, the HARQ field, the TPC field, the DAI field, and the CIF field in the DCI format 2D may be deleted or the bit size thereof may be reduced so as to adjust the payload size of the DCI format 2D to be the same payload size of the DCI format 2A.

The method of removing a PQI field from the DCI format 2D in the embodiments shown in FIGS. 14(c) and 15(c) has the advantage that the payload size is adjusted to be the same payload size of a target DCI format so as to efficiently perform PTM scheduling in a CSS. However, as described above, the PQI field corresponds to a field necessarily required for TM 10-based CoMP operation. Thus, a new method of transmitting the PQI field without passing through the DCI format 2D will be proposed in the following.

In one embodiment, a method of generating a new additional RNTI capable of replacing a function of a PQI field removed from the DCI format 2D and for providing PQI information to a UE using the generated RNTI may be proposed.

For example, a 2bit PQI field may be a PQI information indicating a total four number of PQI states, so four additional RNTIs (e.g., PTM-RNTI 1~4) corresponding to the respective PQI states may be generated. The four RNTIs (e.g., PTM-RNTI 1~4) may be applied as PTM-RNTIs which are used for CRC-scrambling in the above embodiments.

That is, a UE may perform BD in a CSS with respect to the DCI format 2D with a PQI field removed, and descramble a CRC of the DCI format 2D. When a detected RNTI value coincides with any one of the four PTM-RNTIs (PTM-RNTI 1~4) during descrambling of the CRC, the UE may determine detection success, and acquire/receive PQI information by recognizing a PQI state corresponding to the coincided PTM-RNTI. For example, if the coincided PTM-RNTI is PTM-RNTI 3, the UE may decode a PTM-PDSCH by applying setting information of RRC parameter set 3 corresponding to/associated with the conventional PQI state 3.

For such an operation, a base station may transmit PQI parameter sets (e.g., four PQI parameter sets) used in TM 10 to a UE through higher layer signaling (by RRC), and these parameter sets may be defined/set to correspond to specific PTM-RNTIs (e.g., PTM-RNTI-n, n is a natural number), respectively.

As such, an embodiment/exemplary method for reducing the number of times for a UE to performs BD by transmitting PTM via a CSS with a payload size as the same as the payload size of a target DCI format has been described. However, apart from this, to minimize the number of times for the UE to perform BD, a method of defining/setting TDM transmission of each DCI format in each specific subframe set may be also possible. That is, in other words, it is possible to minimize the number of times for the UE to perform BD by pre-defining/pre-setting a DCI format capable of being transmitted in a specific subframe set.

For example, it is possible to set/limit a format capable of being transmitted (for PTM) in a CSS in subframe set #1 to the DCI format 2A, and to set/restrict a format capable of being transmitted (for PTM to target DMRS-based TM (e.g., TM 9 and TM 10) in a CSS in subframe set #2 to the DCI format 2C and/or 2D. In this case, there will be no case of performing BD on the DCI format 2A and the DCI format 2C/2D in at least the same subframe set (that is, it is not necessary to perform BD on both DCI formats having different payload sizes in the same subframe set), and therefore, the number of times for a UE to perform BD with respect to each separate subframe set may be minimized.

To support such an operation, a base station needs to provide information about a subframe set to be mapped to a specific DCI format (the information which is hereinafter referred to as "mapping subframe information") to a UE in advance through an higher layer signal (e.g., an RRC signaling). In this case, various examples of the mapping subframe information may be provided to the UE.

In one example, the mapping subframe information in a bit map form may be provided to a UE. For instance, the base station may provide mapping subframe information, which is mapped to each specific DCI format, in the form of a bit map of each subframe set to a UE, and, a corresponding bit map may indicate that a subframe corresponding to the value "1" is mapped to a specific DCI format (that is, in a subframe corresponding to the value "1" in the bit map, a specific DCI format needs to be detected/BD).

Alternatively, in another example, the base station may provide the mapping subframe information in the form of a single bitmap for a preset number of subframes, not for each subframe set unit to be mapped to a specific DCI format. In this case, the corresponding bitmap may indicate that a subframe corresponding to the value "1" is mapped to a first DCI format (e.g., DCI format 2A), and that a subframe corresponding to the value "0" is mapped to a second DCI format (e.g. DCI format 2C and/or 2D) (which means that the fist DCI format needs to be detected/BD in the subframe corresponding to the value "1", and the second DCI format needs to be detected/BD in the subframe corresponding to the value "0").

In the above example, a unit of a subframe provided in the form of a single bitmap, may be N-SF (N=1, 2, 3, . . . ). If N>1, a subframe from which a UE needs to detect the DCI format 2A or 2C/2D is not every subframe, but N number of periodically conventional subframes. That is, subframe restriction may be set or applied in a manner in which the UE does not need to perform BD in every subframe, and thus, there is an advantage that a network is able to adjust control signaling overhead of PTM transmission scheduling to occur at a rate which is appropriate compared with conventional control signal transmission.

Apart from this, the above-described examples proposed to minimize the number of times for a UE to perform BD may be applied in combination. For example, PQI information indicated by a PQI field is information necessarily required for CoMP operation of the UE, and thus, transmitting TM 10-based DCI format 2D with the PQI field excluded may be a huge burden for the base station. Thus, the base station may transmit the DCI format 2C with at least one field excluded, as described above with reference to FIGS. 14 and 15, and may transmit the DCI format 2D with the PQI field included. Instead, in the latter example, by setting a specific subframe set through which the DCI format 2D is transmitted, the base station may prevent the number of times for the UE to perform BD from increasing.

FIG. 16 is a flowchart illustrating an example of a method of transmitting a DCI by a base station according to an embodiment of the present invention. The above description provided with reference to FIGS. 14 and 15 may be applied identically/similarly as detailed description of this flowchart, and any redundant description will be omitted.

First, the base station may allocate a resource for data transmission in S1610. In this case, the base station may allocate a resource for multicast/broadcast transmission or a resource for unicast transmission.

Next, the base station may transmit scheduling information about the resource allocated for data transmission in a first DCI format in S1620. The first DCI format may correspond to the DCI format 2C or 2D in FIGS. 14 and 15. However, aspects of the present invention are not limited thereto, and the fist DCI format may correspond to any of various DCI formats, as described above.

Next, the base station may transmit data on the scheduling information in S1630.

If a DCI includes scheduling information on multicast/broadcast data (that is, data to be transmitted corresponds to multicast/broadcast data), the payload size of the first DCI format may be adjusted to be the same as the payload size of a preset DCI format and transmitted via a CSS. The second DCI format may correspond to the aforementioned target DCI format, and the second DCI format may, for example, correspond to the DCI format 2A.

In contrast, if a DCI includes scheduling information on unicast data (that is, data to be transmitted corresponds to unicast data), the payload size of the first DCI format may not be adjusted and the first DCI format may be transmitted via a UE-specific Search Space (USS).

Examples about the case where the first DCI format is the DCI format 2C or 2D and the second DCI format corresponds to the DCI format 2A is the same as the above-described examples of FIGS. 14 and 15.

General Device to which Present Invention May be Applied

FIG. 17 is a block diagram of a wireless communication device according to an embodiment of the present invention.

Referring to FIG. 17, a wireless communication system includes a base station (BS) (or eNB) 1710 and a plurality of terminals (or UEs) 1720 located within coverage of the BS 1710.

The eNB 1710 includes a processor 1711, a memory 1712, and a radio frequency (RF) unit 1713. The processor 1711 implements functions, processes and/or methods proposed in FIGS. 1 through 16. Layers of radio interface protocols may be implemented by the processor 1711. The memory 1712 may be connected to the processor 1711 to store various types of information for driving the processor 1711. The RF unit 1713 may be connected to the processor 1711 to transmit and/or receive a wireless signal.

The UE 1720 includes a processor 1721, a memory 1722, and a radio frequency (RF) unit 1723. The processor 1721 implements functions, processes and/or methods proposed in above-described embodiments. Layers of radio interface protocols may be implemented by the processor 1721. The memory 1722 may be connected to the processor 1721 to store various types of information for driving the processor 1721. The RF unit 1723 may be connected to the processor 1721 to transmit and/or receive a wireless signal.

The memory 1712 or 1722 may be present within or outside of the processor 1711 or 1721 and may be connected to the processor 1711 or 1721 through various well known units. Also, the eNB 1710 and/or the UE 1720 may have a single antenna or multiple antennas.

Performance Enhancement of Multicast/Broadcast Transmission Multiple Cells

RAN 1 has investigated performance advantages as well as the following performance enhancement of downlink multicast/broadcast.

Dynamic scheduling for multicast/broadcast transmission (e.g., PDCCH-based scheduling by TBs associated with TMGI)
  Semi-static scheduling for multicast/broadcast
  Use of a DM-RS based transmission scheme by a plurality of transmission points (TPs), the scheme which uses reception for idle UEs (this does not imply introduction of any new TM)
  DMRS-based Single-Cell multicast
  PDSCHs transmitted from multiple TPs
  TP(s), which transmits system information, and a PDSCH/PDCCH-based CRS transmitted from different TP(s)
  DMRS based on PDSCH/EPDCCH transmitted from different TB(s)
  Use of normal CP
  HARQ feedback
  CSI feedback
  Note 1: enhancement of each performance is expected to bring about different result in terms of advantage, complexity, and damage to LTE standard technology specification
  Note 2: specific performance enhancement does not cause damage to the LTE standardization technology specification.
  Note 3: Network/UE complexity is not addressed by RAN 1.
  Note 4: the above performance enhancement case(s) may be assumed with a specific level of inter-TP corporation which does not cause damage to the standard technology specification.
  Note 5: the above performance enhancement case(s) may be based on contribution made by a limited number of company(ies)
  A UE is able to identify which broadcast transmission (e.g., TMGI) is related to the above-described performance enhancement (e.g, based on a location of the UE).

Based on the above description, it may be concluded that expansion of the use of a PDSCH for multi-cell broadcast is useful because a PDSCH is based on a DMRS to make cooperated transmission of multiple cells to be performed similarly to MBMS transmission. More specifically, the PDSCH may be transmitted from a serving cell or a neighboring cell or may be transmitted from multiple cells due to TM 10 operation already being supported. However, transmission from the multi-cells are not allowed based on SC-PTM. It is because SC-PTM is solely based on a CRS in TM 1/TM 2. Hereinafter, a technology relating to multi-cell transmission in light of a physical layer will be described in more detail.

1. Suggestion of Re-Use of TM 10 for Downlink Multicast/Broadcast Enhancement to Support a PDSCH—V2V Service Transmitted from Different TP Sets As described above, the advantage of MBMS multi-cell transmission needs to be facilitated to achieve robustness in terms of performance. Regarding this, it is desirable to re-use a physical format of a PDSCH, and, as a result, overall performance enhancement may be expected. In order to achieve substantially significant effects/advantages and enable efficient implementation on the conventional cellular network, it is desirable that a PDSCH format-based TM 10 is re-used in DL multicast/broadcast. In addition, identified performance enhancement principles are properly activated by TM 10 compared with CRS-based TMs, which are expected to cause a lot of changes and damages to the conventional technology specification to achieve identified effects/advantages. And thus, it is desirable to re-use the PDSCH format-based TM 10 in DL multicast/broadcast.

TM 10 already supports transmission of PDSCHs from different TP sets. For example, in a V2V service, a UE may receive a PDSCH for broadcast from a set of TPs in one resource and from a set of different TPs in a different resource. For respective PDSCH transmission, each TP set may be composed of at least one TP. Multiple TPs may belong to the same cell or different cells.

FIG. 18 shows an example of one TP set in which multiple TPs transmitting PDSCHs is included.

If TPs belong to different cells, the TPs may belong to the same base station or different base stations, as shown in FIG.

18. From the perspective of a UE, a TP participating in PDSCH transmission for broadcast may or may not belong to a serving cell.

If the multiple TPs belongs to different base stations, PDSCH broadcast may be scheduled by an MCE, similarly in the case of MBSFN transmission. That is, the MCE may periodically select a MCS level for transmission of a time/frequency resource and transmission of PDSCHs by the different base stations.

If the multiple TPs belongs to the same base station, the PDSCH broadcast may be scheduled by the base station, similarly to the case of SC-PTM. That is, the base station may select a time/frequency resource and an MCS level for PDSCH broadcast transmission (e.g., the case where scheduling information is not provided by the MCE).

Dynamic scheduling of downlink broadcast is very useful for supporting a V2V service. Thus, a PDCCH may be used to inform UE of a scheduled PDSCH, regardless of whether the TPs belong to the same base station. From the perspective of a UE, PDSCH broadcast from the multiple TPs may be scheduled similarly to the case of SC-PTM. From the perspective of a network, an MBSFN region concept may be used when PDSCHs are broadcasted from multiple cells.

The MCE may employ M2 signaling to adjust which subframe participates in multi-cell PDSCH broadcast. This is very similar to configuration/setting of MBSFN subframes.

PDSCH broadcast from the multiple TPs may be transmitted to any subframe (that is, it is not limited to an MBSFN subframe). Hereinafter, TM 10-based operation for V2X will be described in more detail.

2. Quasi Co-Location

Legacy QCL signaling and its relevant operations are optimized for single-cell transmission.

Suggestion of appropriate performance enhancement of QCL and RM operations to support DMRS-based PDSCH broadcast on the basis of multiple-cell/TP joint transmission In the case where downlink multicast/broadcast is a multi-TP joint transmission type, it is necessary to further consider the conventional UE's operation regarding QCL which is assumed in TM 10. For a UE in which TM 10 is set, QCL type A or QCL type B may be set through RRC signaling. Type A basically implies that QCL is set between all RS ports set in a UE. Type B indicates QCL of one CSI-RS resource about a PDSCH DMRS in a given subframe so that a UE is able perform Dynamic Point Selection (DPB) to receive a PDSCH.

The legacy operation about such QCL assumption may be considered not to be optimized multi-cell/TP joint transmission, but to be optimized for a target single cell/TP transmission. As such, QCL CSI-RS dynamically indicated by DCI signaling may be generally transmitted from a single cell/TP. Thus, it is necessary to consider in detail a method for providing appropriate QCL signaling as well as PDSCH Rate Matching (RM) which is to support DMRS-based PDSCH broadcast from sets of TPs.

Regarding CoMP, joint transmission having necessary QCL signaling has been partially discussed. However, this targets "coherent JT(Joint Transmission)" based on a CSI feedback from a UE. On contrary, due to high mobility of a UE (in addition, in order to use "non-coherent JT" for PDSCH broadcast), PDSCH broadcast for a V2X service may be performed substantially based on open-loop transmission. If TM 10 is set in a UE, Inter-TP cooperation for JT, point selection, and muting cannot be recognized by the UE that is not capable of performing QCL and RM.

Hereinafter, candidate open-loop schemes for supporting PDSCH broadcast from the perspective of an higher layer will be described in more detail.

3. Open-Loop Precoding—To achieve robust performance of PDSCH broadcast, it is necessary to further consider schemes for performing Open-Loop (OL)-MIMO precoding in one cell and obtaining macro diversities from multiple cells/TPs.

As described above, open-loop precoding schemes based on appropriate DMRS for PDSCH broadcast needs to be studied more by classifying the schemes into categories as below.

(1) Schemes for Obtaining Macro Diversity from Multiple Cells

Multiple cells participating in PDSCH broadcast transmission may transmit the same V2X messages through SFN transmission. The same V2X messages may be combined in the air. The SFN transmission's difference from MBMS transmission maybe a smaller size of a cluster composed of some cells/TPs, and a significantly reduced RS compared with DMRS-based PDSCHs and MSFN RSs.

In the case where cell-TP CSI-RS resources shared for the SFN transmission are used, there may be as many cell/TP combinations respectively corresponding to the CSI-RS resources as many, and the combinations may be transmitted at least for the purpose of QCL (however, this causes expanded CSI-RS overhead). To avoid such CSI-RS overhead, it is necessary to further study combinations on the side of UE when it comes to QCL tracking per TP and SFN transmission in a given cluster.

(2) Schemes for OL-MINO Precoding in One Cell

Along with the macro diversity schemes described above with respect to multiple of cells/TPs, it may be desirable that a PDSCH transmitted to each call is generated by specific OL-MIMO or semi-OL MIMO precoding. More specifically, to achieve even a frequency diversity, an RB level and/or an RE level's precoder cycling may be considered additionally. The semi-OL MIMO discussed regarding eFD-MIMO may be applied for PDSCH. For example, not just for PDSCH broadcast, but also for unicast, the semi-OL MIMO may be applied by re-using a semi-OL MIMO in which a CSI feedback is set or by independent/dedicated CSI feedback (for example, R1 and W1 feedback, and additionally CQI feedback (together with an associated/dedicated CSI procedure setting)) (for example, when semi-OL MIMO dedicated for PDSCH broadcast is set).

4. PDCCH-Based Dynamic Scheduling

For supporting V2V, dynamic scheduling of downlink broadcast is very useful. To enable the dynamic scheduling this, it is necessary to discuss/determine an issue regarding a search space/DCI format for PDSCH broadcast scheduling. PDSCH broadcast may be dynamically scheduled by a L1 scheduling grant. In this case, a relevant DCI may be transmitted through a CSS, as described above with reference to FIGS. 14 and 15.

Since DCI format 2D and 1A are used in TM 10, these are allowed to be reused for downlink broadcast scheduling. In this case, however, to avoid additional BD complexity, it is desirable that the corresponding formats are transmitted to have the same payload size as that of a legacy DCI format transmitted in the CSS, as described above.

To make the corresponding DCI formats have the same payload size, an conventional field of the corresponding DCI formats may be deleted, the size of the conventional field may be deleted, or the conventional field may be replaced with a new field necessary for PDSCH broadcast scheduling. Detailed examples regarding this are the same as the above examples described with reference with FIGS. 14 to 16, and additional examples not described above will be provided later.

Although a target DCI format is described as DCI format 2A in FIGS. 14 to 16, the target DCI format will be described as DCI format 1A in the following. That is, FIGS. 14 to 16 show examples in which the payload size of the DCI format 2C/2D is adjusted to have the same size as that of the DCI format 2A, but the following examples show the case where the payload size of the DCI format 2C/2D is adjusted to be the same as that of the DCI format 1A. However, aspects of the present invention is not limited thereto, as described above, and a payload size of a specific DCI format may be adjusted to have the same payload size of a target DCI format in order to minimize the number of times to perform BD.

In one example, a conventional resource allocation field may be replaced with a field of a more compact format (that is, a field having a smaller payload size). For example, a RA field of the DCI format 2D it may be replaced with a RA field of a more compact format (e.g., a RA field of the DCI format 1A).

And/or, in another embodiment, a conventional field about DMRS settings may be deleted, or the field may be replaced with a field of a more compact format (that is, a field having a smaller payload size). In the case where DCI to be transmitted by a base station is not DCI for MU-MIMO, information about DMRS settings may be fixed in the form of single DMRS sequence setting/VCID information, port/layer indicator information, and/or OCC information, or the information may be in the form of an higher layer signal, such as RRC signaling, to be transmitted/set to a UE.

If the base station wishes to dynamically indicate a plurality of DMRS settings, a conventional field (3 bits) for DMRS setting may be adjusted to 1-bit or 2-bit independently of and differently from the conventional DCI format 2C/2D. Thus, only some of information included in the conventional DMRS field of the DCI format DC/2D may be transmitted to a UE through a DMRS field that is adjusted according to this embodiment.

And/or, in yet another embodiment, the size of an MCS indication field may be reduced. More specifically, the MCS 1 field/RV 1 field and the MCS 2 field/RV 2 field included both in the DCI format 2C and the DCI format 2D in order to leave only the MCS 1 field and the RV 1 field in a payload (that is, only the MCS 2 field/RV 2 field are deleted).

In other words, it may be understood that it is restricted to use only a single TB/codeword for the purpose of PDSCH broadcast. That is, the PDSCH broadcast may be defined/set in a form of transmission only to rank 1(layer1). Alternatively, even though transmission to a plurality of ranks/layers is allowed for PDSCH broadcast, it may be understood that the DCI format is restricted to be transmitted to the plurality of ranks/layers by CW(codeword)-to-layer mapping that is derived from a single codeword/TB, as the conventional retransmission method does.

And/or, in yet another embodiment, a HARQ field (3 bits or 4 bits) may be deleted. That is, in PDSCH broadcast transmission, it may be limited to applying a single HARQ process It is because a HARQ ID indication field is not necessary when a single HARQ process is applied.

And/or, a few number of HARQ IDs (that is, the number of HARQ IDs less than the conventional number of HARQ IDs) may be supported, and, in this case, a 1-bit or 2-bit HARQ field which is in size more compact than the size of the conventional HARQ field may be newly defined/set for PDSCH broadcast. For example, a HARQ field may be re-designed in the size of 2 bits so as to indicate four HARQ IDs at maximum, and, in this case, even a timeline may be defined/set independently of and differently from the conventional timeline.

And/or, in yet another embodiment, a SRS request field may be deleted when PDSCH broadcast is limited to be scheduled by a CSS.

And/or, a TPC field may be deleted. A conventional TPC field is used to indicate power control of a UE's transmission of an ACK/NACK feedback (on PUCCH) regarding PDSCH unicast. However, in the case of PDSCH broadcast, a plurality of UE shares a specific resource to transmit ACK/NACK, so PDSCH broadcast is carried out with operations different from what is required for unicast PDSCH, and thus, a TPC field may be unnecessary for PDSCH broadcast. Thus, the payload size may be adjusted by deleting the TPC field. However, in this case, a UE may be defined/set to always perform ACK/NACK at a specific pre-defined/pre-configured power level. The power level may be set by the UE through RRC signaling (RRC-configurable).

Or, the size of the TPC field may be adjusted to 1-bit. In this case, the TPC field may be defined/set to indicate adjusting power levels of ACK/NACK transmitted together by a plurality of UEs having received PDSCH broadcast. The TPC field may be distinguished/separated not to be mixed/accumulated with other TPC fields existing in a DL grant for scheduling of other PDSCH unicast. In other words, even though DL grants are received, a UE may be restricted to share (or accumulate) information between TPC fields existing in a DL for scheduling of PDSCH unicast. In doing so, the UE may distinguish a TPC field for scheduling of PDSCH unicast and a TPC field for scheduling of PDSCH broadcast (or special PDSCH transmission in a specially indicated form), and the UE may follow indication in an additionally distinguished/separated TPC field according to a situation.

And/or, in yet another embodiment, when a TDD scheme is applied for PDSCH broadcast, "DAI field" may remain intact or may be simplified. In this case, the DAI field may be used to indicate which number (subframe) transmission the corresponding broadcast is. Alternatively, the DAI field may be deleted for PDSCH broadcast, and, in this case, the DAI field may be deleted to be re-interpreted as a form which indicates scheduling of PDSCH broadcast corresponding to the corresponding scheduling subframe.

As such, an additional embodiment in which conventional fields in a specific DCI format is simplified or removed has been described. In this case, instead of the deleted/removed field, at least one filed including the following information necessarily required for scheduling of PDSCH broadcast may be added. However, replacement of a field should satisfy a condition that a corresponding DCI format needs to have a payload size as the same as that of a target DCI format.

As described above, PQI information included in a PQI field may be information necessarily required for scheduling of PDSCH broadcast. Thus, the PQI field may be inserted into DCI, instead of fields, for example, the HARQ field, the DMRS setting field, and/or the TPC field, which can be deleted in the above-described examples.

And/or, the PQI field may be modified such that some information of a parameter set is deleted or added. As a typical example, QCL and RM-related information in the PQI field may be updated/changed so as to indicate multiple cells/TPs (for example, when scheduling SPN transmission, the base station indicates, through the PQI field, which cells/TPs the QCL/RM operation need to be performed. In this case, each cell/TP may be indicated in a form corresponding to a specific RS (e.g., CSI-RS ID)).

And/or, the TMGI indicator-related information/field may be inserted into DCI, instead of the above-suggested fields which can be deleted, and the corresponding TMGI indicator-related information/field may be defined/set to indicate a TMGI ID, a MBSFN region ID, and/or a specific packet ID.

Thus, if a DCI format for scheduling of PDSCH broadcast is designed as above, the payload size of the DCI format 2C/2D may become identical or similar to the payload size of the DCI format 1A (as a result, the number of times for a UE to perform BD may be minimized). Furthermore, as described above, when the DCI format 2C/2D uses the same RA field as that of the DCI format 1A, the DCI format 2C/2D, except for the PQI field and/or the TMGI indication field may be considered to have been designed based on the DCI format 1A.

As such, DCI for PDSCH broadcast, which is designed based on the principle proposed in this specification, may be indicated as a new name "DCI format 1F", and, as TM for receiving PDSCH broadcast, a newly defined TM may be given or may be applied to a conventionally defined TM, such as TM 10.

If the above examples are applied to a conventional TM, such as TM 10, there are three types of DCI formats that a UE needs to perform BD, as below:

DCI format 2D (or 2C): (unicast) TM-dependent DCI
DCI format 1A: (unicast) fallback purpose
DCI format 1F: (multicast/broadcast) DCI Meanwhile, a DCI format, such as the DCI format 2D and the like, to be used for PDSCH broadcast, is not changed by adjusting a payload size thereof to be the same as a payload size of a target DCI format, such as the conventional DCI format 1A, and the DCI format may be defined/set as a form such that a UE perform BD in a CSS independently (that is, a form which triggers increase of the number of times to perform BD). Instead, to reduce the increase in the number of times to perform BD, a subframe set restriction may be defined/set as described above to as to transmit/perform BD on the specific DCI format (e.g., DCI format 2D) for PDSCH broadcast only with respect to a specific (pre-defined/pre-configured) subframe set The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various modes for carrying out the invention have been described in the mode for invention.

INDUSTRIAL APPLICABILITY

The method for assisting communication between UEs in a wireless communication system of the present invention has been described on the basis of the example applied to the 3GPP LTE/LTE-A system, but the present invention may also be applied to various wireless communication systems other than the 3GPP/LTE/LTE-A system.

The invention claimed is:

1. A method for transmitting Downlink Control Information (DCI) by a base station in a wireless communication system, the method comprising:
    allocating a resource for data transmission;
    transmitting, in a first DCI format, DCI including scheduling information about the allocated resource; and
    transmitting data according to the scheduling information,
        wherein, when the DCI includes scheduling information about multicast/broadcast data, the first DCI format is transmitted in a payload size, which is adjusted to be identical to a payload size of a pre-configured second DCI format, through a Common Search Space (CSS),
    wherein, when the DCI includes scheduling information about unicast data, the first DCI format is transmitted in a payload size, which is not adjusted, through a UE-specific Search Space (USS), and
    wherein the second DCI format is DCI format 2A and the first DCI format is one of DCI format 2C and DCI format 2D.

2. The method of claim 1, wherein when the payload size of the first DCI format is adjusted to be identical to the payload size of the second DCI format, it is adjusted by deleting at least one field of a plurality of fields included in the payload of the first DCI format or by reducing a bit size of the at least one field.

3. The method of claim 2, wherein the second DCI format is DCI format 2A and the first DCI format is DCI format 2C.

4. The method of claim 3, wherein the first DCI format is scrambled by a Point to Multipoint-Radio Network Temporary Identifier (PTM-RNTI), which is newly defined for multicast/broadcast transmission, and the scrambled first DCI format is transmitted.

5. The method of claim 3, wherein, when the first and second DCI formats are transmitted in a Frequency Division Duplex (FDD) scheme and a bit size of a Rank field included in a payload of the second DCI format is set to 0 bits, at least one field of a New Data Indicator (NDI) field, a Modulation and Coding Scheme (MCS) 2 field, a Redundancy Version (RV) 2 field, a Hybrid Automatic Repeat Request (HARQ) field, a Transmit Power Control (TPC) field, and a Carrier Indicator Field (CIF) included in the payload of the first DCI format is deleted or a bit size of the at least one field is reduced.

6. The method of claim 3, wherein, when the first and second DCI formats are transmitted in a Time Division Duplex (TDD) scheme and a bit size of a rank field included in the second DCI format is set to 2 bits, a Sounding Reference Signal (SRS) field is deleted from the payload of the first DCI format and the payload of the first DCI format is transmitted.

7. The method of claim 3, wherein, when the first and second DCI formats are transmitted in a TDD method and a bit size of a Rank field included in the payload of the second DCI format is set to 0 bits, an SRS field is deleted from the payload of the first DCI format, the payload of the first DCI format is transmitted and, additionally, at least one field of an NDI field, an MCS 2 field, an RV 2 field, an HARQ field, a TPC field, a Downlink Assignment Index (DAI) field, and a CIF is deleted or a bit size of the at least one field is reduced.

8. The method of claim 2, wherein the second DCI format is DCI format 2A and the first DCI format is DCI format 2D.

9. The method of claim 8, wherein, when the first and second DCI formats are transmitted in an FDD scheme and a bit size of a Rank field included in the payload of the second DCI format is set to 2 bits, a PDSCH RE Mapping and Quasi-co-location Indicator (PQI) field are deleted from the payload of the first DCI format and the payload of the first DCI format is transmitted.

10. The method of claim 9, wherein, when a PTM-RNTI for indicating PQI information included in the deleted PQI field is separately defined, the first DCI format is scrambled by the PTM-RNTI and transmitted.

11. The method of claim 10, wherein information about a PTM-RNTI corresponding to the PQI information is transmitted via higher layer signaling.

12. The method of claim 8, wherein, when the first and second DCI formats are transmitted in a TDD scheme and a bit size of a Rank field included in the payload of the second DCI format is set to 2 bits, a PQI field and a SRS field are deleted from the payload of the first DCI format and the payload of the first DCI format is transmitted.

13. The method of claim 8, wherein, when the first and second DCI formats are transmitted in a TDD scheme and a bit size of a Rank field included in the payload of the second DCI format is set to 0 bits, a PQI field and a SRS field are deleted from the payload of the first DCI format, the payload of the first DCI format is transmitted, and, additionally, at least one field of an NDI field, an MCS 2 field, an RV 2 field, an HARQ field, a TPC field, a DAI field, and a CIF is deleted or a bit size of the at least one field is reduced.

14. The method of claim 13, wherein, when a PTM-RNTI is separately defined to indicate PQI information included in the deleted PQI field, the first DCI format is scrambled by the PTM-RNTI and transmitted.

15. The method of claim 14, wherein information about the PTM-RNTI corresponding to the PQI information is transmitted via higher layer signaling.

16. device for transmitting Downlink Control Information (DCI) in a wireless communication system, the method comprising:
a transmitter and a receiver configured to transmit and receive a radio signal; and
a processor configured to control the RF unit transmitter and the receiver,
wherein the base station is configured to:
allocate a resource for data transmission;
transmit, in a first DCI format, DCI including scheduling information about the allocated resource; and
transmit data according to the scheduling information,
wherein, when the DCI includes scheduling information about multicast/broadcast data, the DCI is transmitted in a payload size, which is adjusted to be identical to a payload size of a preset second DCI format, through a Common Search Space (CSS),
wherein, when the DCI includes scheduling information about unicast data, the first DCI format is transmitted in a payload size, which is not adjusted, through a UE-specific Search Space (USS), and
wherein the second DCI format is DCI format 2A and the first DCI format is one of DCI format 2C and DCI format 2D.

* * * * *